United States Patent
Yonekura et al.

(10) Patent No.: US 12,051,412 B2
(45) Date of Patent: Jul. 30, 2024

(54) CONTROL DEVICE, SYSTEM, AND CONTROL METHOD

(71) Applicant: Preferred Networks, Inc., Tokyo (JP)

(72) Inventors: Kenta Yonekura, Tokyo (JP); Hirochika Asai, Tokyo (JP); Kota Nabeshima, Tokyo (JP); Manabu Nagao, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 403 days.

(21) Appl. No.: 17/445,530

(22) Filed: Aug. 20, 2021

(65) Prior Publication Data
US 2021/0383808 A1 Dec. 9, 2021

Related U.S. Application Data

(63) Continuation of application No. PCT/JP2020/001718, filed on Jan. 20, 2020.

(30) Foreign Application Priority Data

Feb. 26, 2019 (JP) .................................. 2019-032699
Oct. 30, 2019 (JP) .................................. 2019-197505

(51) Int. Cl.
*G10L 15/02* (2006.01)
*G10L 15/22* (2006.01)
(Continued)

(52) U.S. Cl.
CPC .............. *G10L 15/22* (2013.01); *G10L 15/02* (2013.01); *G10L 21/0208* (2013.01);
(Continued)

(58) Field of Classification Search
CPC ................... G10L 2015/025; G10L 2015/223
See application file for complete search history.

(56) References Cited

U.S. PATENT DOCUMENTS 11,433,546 B1 * 9/2022 Assaf ....................... B25J 5/007
2006/0058920 A1 3/2006 Matsunaga et al.
(Continued)

FOREIGN PATENT DOCUMENTS

EP 2230054 A1 * 9/2010 ............. A61B 34/30
JP S60-217395 10/1985
(Continued)

OTHER PUBLICATIONS

W. Zhao, R. Chellappa, A. Rosenfeld, "Face recognition: A literature survey," ACM Comput. Surv., vol. 35, No. 4, pp. 399-458, Dec. 2003.
(Continued)

*Primary Examiner* — Daniel C Washburn
*Assistant Examiner* — Oluwadamilola M Ogunbiyi
(74) *Attorney, Agent, or Firm* — IPUSA, PLLC

(57) ABSTRACT

A control device includes at least one memory, and at least one processor configured to detect a voice segment from sound data, the sound data being detected while a controlled object operates, and stop the controlled object based on following conditions: a speaking speed is a predetermined speed threshold or greater, the speaking speed being calculated based on a portion of the sound data in the voice segment; and a length of the voice segment is a predetermined length threshold or less.

18 Claims, 16 Drawing Sheets

(51) Int. Cl.
  *G10L 21/0208* (2013.01)
  *G10L 25/78* (2013.01)
  *G10L 25/87* (2013.01)
(52) U.S. Cl.
  CPC ........ *G10L 25/87* (2013.01); *G10L 2015/025* (2013.01); *G10L 2015/223* (2013.01); *G10L 2015/226* (2013.01); *G10L 2025/783* (2013.01)

(56) References Cited

U.S. PATENT DOCUMENTS

| | | | | |
|---|---|---|---|---|
| 2008/0319755 | A1* | 12/2008 | Nishiike | G10L 13/08 704/E13.011 |
| 2009/0156241 | A1* | 6/2009 | Staffaroni | G06Q 10/08 704/231 |
| 2012/0075091 | A1* | 3/2012 | Clough | E05F 15/40 704/275 |
| 2016/0239697 | A1 | 8/2016 | Nozaka et al. | |
| 2017/0128293 | A1* | 5/2017 | Tsusaka | A61G 7/10 |
| 2017/0239812 | A1 | 8/2017 | Thapliya | |
| 2017/0282359 | A1* | 10/2017 | Higuchi | B25J 15/083 |
| 2018/0052434 | A1* | 2/2018 | Maekawa | G06F 11/00 |
| 2018/0122361 | A1 | 5/2018 | Silveira Ocampo | |
| 2018/0299689 | A1* | 10/2018 | Takahashi | G02B 7/04 |
| 2018/0317725 | A1 | 11/2018 | Lee et al. | |
| 2018/0354140 | A1 | 12/2018 | Watanabe | |
| 2018/0366944 | A1* | 12/2018 | Maekawa | H03L 19/017581 |
| 2019/0118386 | A1 | 4/2019 | Okumura et al. | |
| 2019/0262998 | A1* | 8/2019 | Sasagawa | G10L 15/26 |
| 2019/0353298 | A1 | 11/2019 | Okumura et al. | |
| 2019/0391828 | A1* | 12/2019 | Tokuhashi | G06F 3/0488 |
| 2020/0039080 | A1* | 2/2020 | Oyaizu | B25J 13/003 |
| 2020/0050462 | A1* | 2/2020 | Chen | G06F 8/34 |
| 2020/0075036 | A1 | 3/2020 | Shin | |
| 2020/0090099 | A1* | 3/2020 | Johnson | B25J 9/161 |
| 2020/0189100 | A1* | 6/2020 | Rácz | G05B 19/4103 |
| 2020/0198676 | A1* | 6/2020 | Goto | B61L 27/70 |
| 2020/0267350 | A1* | 8/2020 | Kawabata | G06T 7/70 |
| 2020/0269436 | A1* | 8/2020 | Sasagawa | H04R 1/028 |
| 2021/0001480 | A1* | 1/2021 | Artes | B25J 9/161 |
| 2021/0158807 | A1* | 5/2021 | Aher | G10L 15/26 |
| 2021/0210096 | A1* | 7/2021 | Miyazaki | G06F 16/90332 |
| 2021/0354300 | A1 | 11/2021 | Nagao et al. | |
| 2021/0401365 | A1* | 12/2021 | Höynälä | G08B 21/0225 |

FOREIGN PATENT DOCUMENTS

| | | | | |
|---|---|---|---|---|
| JP | H05-273992 | | 10/1993 | |
| JP | H06-175689 | | 6/1994 | |
| JP | H06-348299 | | 12/1994 | |
| JP | 2005-202076 | | 7/2005 | |
| JP | 2006-095635 | | 4/2006 | |
| JP | 2006-179071 | | 7/2006 | |
| JP | 2007-025140 | | 2/2007 | |
| JP | 2007-221300 | | 8/2007 | |
| JP | 2008-049462 | | 3/2008 | |
| JP | 2015-148701 | | 8/2015 | |
| JP | 2015-181778 | | 10/2015 | |
| JP | 2016-153999 | | 8/2016 | |
| JP | 2017-151517 | | 8/2017 | |
| JP | 2018-023464 | | 2/2018 | |
| JP | 2018-194832 | | 12/2018 | |
| JP | 2019211586 A | * | 12/2019 | ............. G10L 13/00 |
| WO | WO-2010072965 A1 | * | 7/2010 | ............. A63F 13/10 |
| WO | 2017/098713 | | 6/2017 | |
| WO | WO-2017130303 A1 | * | 8/2017 | ............. F04B 49/02 |
| WO | WO-2018199344 A1 | * | 11/2018 | ........... A47L 11/4005 |
| WO | WO-2019016938 A1 | * | 1/2019 | |

OTHER PUBLICATIONS

Michael D. Breitenstein, Daniel Kuettel, Thibaut Weise, Luc van Gool, and Hanspeter Pfister,"Real-time face pose estimation from single range images," CVPR, 2008.

H. Pan, R. Scheibler, E. Bezzam, I. Dokmanic, and M. Vetterli,"FRIDA: FRI-based DOA estimation for arbitrary array layouts," Proc. ICASSP, pp. 3186-3190, 2017.

H. Pan, R. Scheibler, E. Bezzam, I. Dokmanic, and M. Vetterli,"FRIDA: FRI-based DOA estimation for arbitrary array layouts," pp. 1-5, Dec. 2, 2016.

R. Schmidt, "Multiple emitter location and signal parameter estimation," IEEE Trans. Antennas Propag., vol. 34, Issue 3, pp. 276-280, Mar. 1986.

Author unlisted,"Types of phonation", Jan. 29, 2019 version, <https://web.archive.org/web/20190129235540/http://www.ims.uni-stuttgart.de/institut/arbeitsgruppen/phonetik/EGG/page10.htm>.

G. N. Meenakshi and P. K. Ghosh, "Robust Whisper Activity Detection Using Long-Term Log Energy Variation of Sub-Band Signal," in IEEE Signal Processing Letters, vol. 22, No. 11, pp. 1859-1863, Nov. 2015, doi: 10.1109/LSP.2015.2439514.

Hui Liu and Evangelos Milios, "Acoustic positioning using multiple microphone arrays" in The Journal of the Acoustical Society of America 117, 2772 (2005); <URL:https://doi.org/10.1121/1.1895005>.

Zeynab Raeesy, "Whisper to Alexa, and She'll Whisper Back" Sep. 26, 2018 <URL:https://www.amazon.science/blog/whisper-to-alexa-and-shell-whisper-back >.

Zeynab Raeesy, Kellen Gillespie, Chengyuan Ma, Thomas Drugman, Jiacheng Gu, Roland Maas, Ariya Rastrow, Bjorn Hoffmeister, "LSTM-based Whisper Detection" Revised Sep. 20, 2018 <URL:https://arxiv.org/pdf/1809.07832v1.pdf>.

* cited by examiner

CONTROL DEVICE, SYSTEM, AND CONTROL METHOD

CROSS-REFERENCE TO RELATED APPLICATIONS

This application is a continuation application of International Application No. PCT/JP2020/001718 filed on Jan. 20, 2020, and designating the U.S., which is based upon and claims priority to Japanese Patent Application No. 2019-032699, filed on Feb. 26, 2019, and Japanese Patent Application No. 2019-197505, filed on Oct. 30, 2019, the entire contents of which are incorporated herein by reference.

BACKGROUND

1. Technical Field

The disclosure herein relates to a control device, a system, and a control method.

2. Description of the Related Art

A conventional method of controlling an emergency stop of a controlled object (such as a robot) based on a user's voice instruction is known. For example, a control method of emergently stopping a controlled object by identifying a voice production with a long sound of a vowel, such as "tomare-" (corresponding to "stop" in English) or the like is known.

With respect to the above, a user's voice directed toward a controlled object varies depending on situations. Thus, there are cases where an emergency stop of the controlled object is not desired when producing a voice with a long sound of a vowel, or, conversely, there are cases where an emergency stop of the controlled object is desired when producing a voice with no long sound of a vowel. That is, in the above-described control method, it is anticipated that the controlled object cannot be emergently stopped as intended by a user.

A controller, a system, and a method of controlling an emergency stop of a controlled object based on a voice instruction is desired.

SUMMARY

According to one aspect of the present disclosure, a control device includes at least one memory, and at least one processor configured to detect a voice segment from sound data, the sound data being detected while a controlled object operates, and stop the controlled object based on following conditions: a speaking speed is a predetermined speed threshold or greater, the speaking speed being calculated based on a portion of the sound data in the voice segment; and a length of the voice segment is a predetermined length threshold or less.

DETAILED DESCRIPTION

Figure 1:
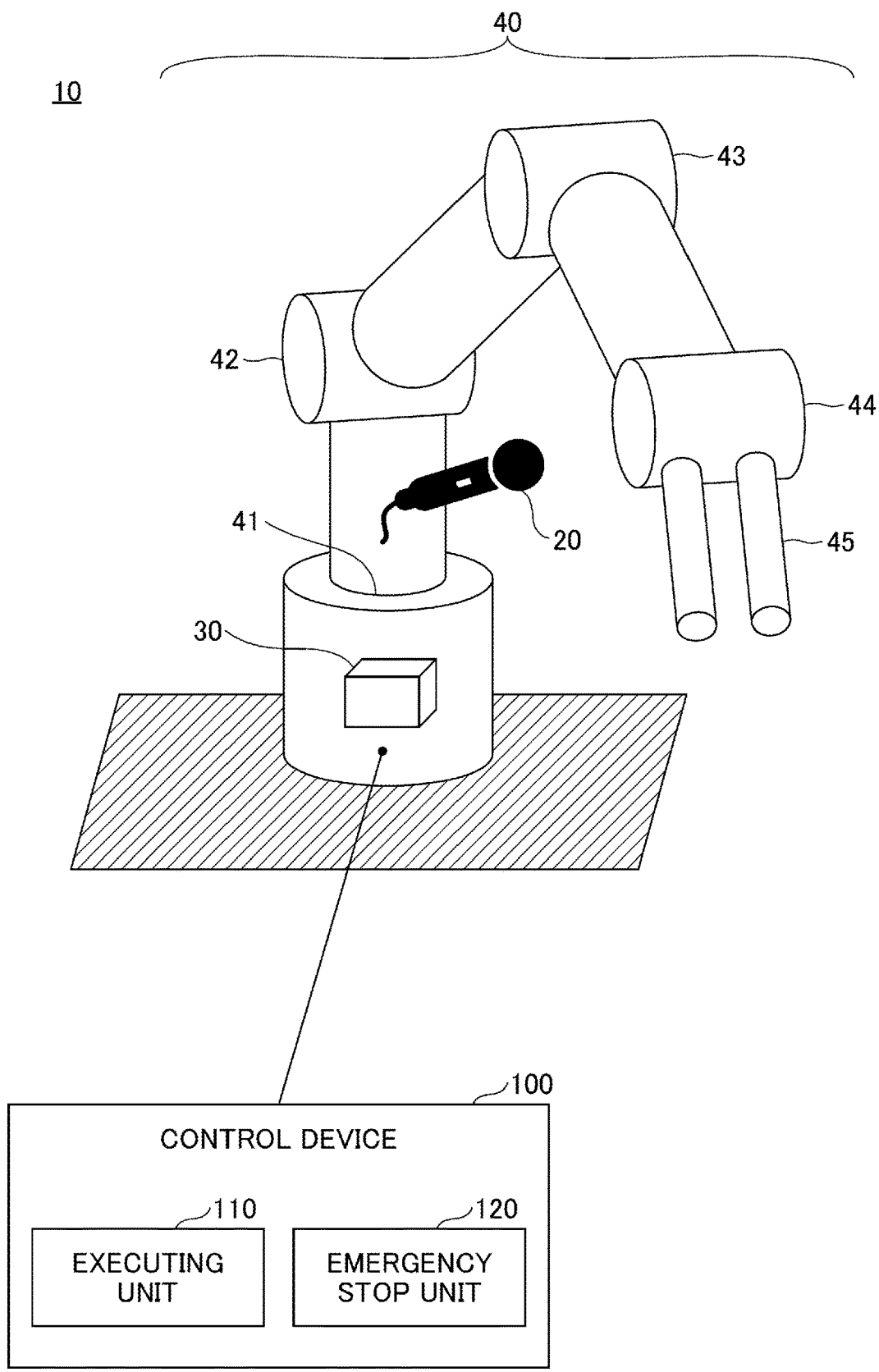
FIG. 1 is a drawing illustrating an example of an appearance configuration of a robot.

In the following, the embodiments will be described with reference to the accompanying drawings. The following embodiments focus on the fact that when, during an operation of a controlled object, a situation in which the controlled object is required to be emergently stopped occurs (for example, when a danger is imminent to a user), the user typically shouts a short word quickly (in some cases, a word that does not make sense).

Specifically, focusing on the length of a voice segment of a voice produced by a user and the speaking speed, when the length of the voice segment is short (less than or equal to a predetermined length threshold) and the speaking speed is fast (greater than or equal to a predetermined speed threshold), a control device determines that a situation in which the controlled object is required to be stopped emergently has occurred.

Consequently, according to the following embodiments, when a situation in which the controlled object is required to be stopped emergently has occurred, the controlled object can be stopped emergently by capturing a voice produced at once by a user (i.e., a voice produced emergently), thereby enabling the controlled object to be stopped emergently as intended by the user.

In the following embodiments, the "speaking speed" refers to the number of phonemes per unit time, and the "length of the voice segment" refers to the length of time from the start to the end of producing a voice (the length of time from the start to the end of voice data). The "voice" refers to a voice of a person, and the "sound" refers to any stimulus to hearing, and is a concept that includes the voice.

In the following, the embodiments will be described in detail. In the present specification and the drawings, components having substantially the same functional configuration are referenced by the same reference numeral, and the overlapping description is omitted.

First Embodiment

<Appearance Configuration of a Robot>

First, an appearance configuration of a robot that is an example of an object controlled by a control device according to the present embodiment will be described. FIG. 1 is a drawing illustrating an example of the appearance configuration of the robot.

As illustrated in FIG. 1, the robot 10 includes a movable part 40 (multiple joints 41 to 44 and an end effector 45), a microphone 20, and a camera 30.

The movable part 40 performs an operation for the robot 10 to perform various operations (for example, an operation of grasping an object and moving the grasped object to a destination). The multiple joints 41 to 44 and the end effector 45 included in the movable part 40 each include an actuator.

The microphone 20 is an example of a sound collecting device, and detects sound propagating through air or the like and generates sound data. The sounds detected by the microphone 20 include environmental sounds around the robot 10 as well as voices produced by a user of the robot 10.

Although only one microphone 20 is illustrated in the example of FIG. 1, the robot 10 may include multiple microphones. Multiple microphones can identify the incoming direction of the sound (e.g., the direction in which the user who produces the voice is located).

Although a case, in which the microphone 20 is mounted on the robot 10, is illustrated in the example of FIG. 1, the microphone 20 may be disposed, for example, on a wall or a ceiling around a space in which the robot 10 is installed. Further, the sound collecting device is not limited to the microphone, and a sound collecting device other than the microphone may be mounted on the robot 10 or the like.

The camera 30 is an example of an imaging device. The camera 30 captures an image around the robot 10 and generates image data. In the example of FIG. 1, a case, in which the camera 30 is mounted on the robot 10, is illustrated, but the camera 30 may be provided separately from the robot 10. Additionally, the imaging device is not limited to the camera, and an imaging device other than the camera may be mounted on the robot 10 or the like.

Further, as illustrated in FIG. 1, the robot 10 includes a control device 100. The control device 100 includes an executing unit 110 that controls an actuator to operate the movable part 40, so that the robot 10 performs various operations. Additionally, the control device 100 includes an emergency stop unit 120 for emergently stopping the robot 10 based on the sound data generated by the microphone 20 (and the image data generated by the camera 30).

It is not necessary that the control device 100 is included in the robot 10 and may be provided separately from the robot 10 outside the robot 10. In this case, a robot control system including the robot 10 and the control device 100 is formed.

<Hardware Configuration of the Control Device>

Next, a hardware configuration of the control device 100 included in the robot 10 will be described.

Figure 2:
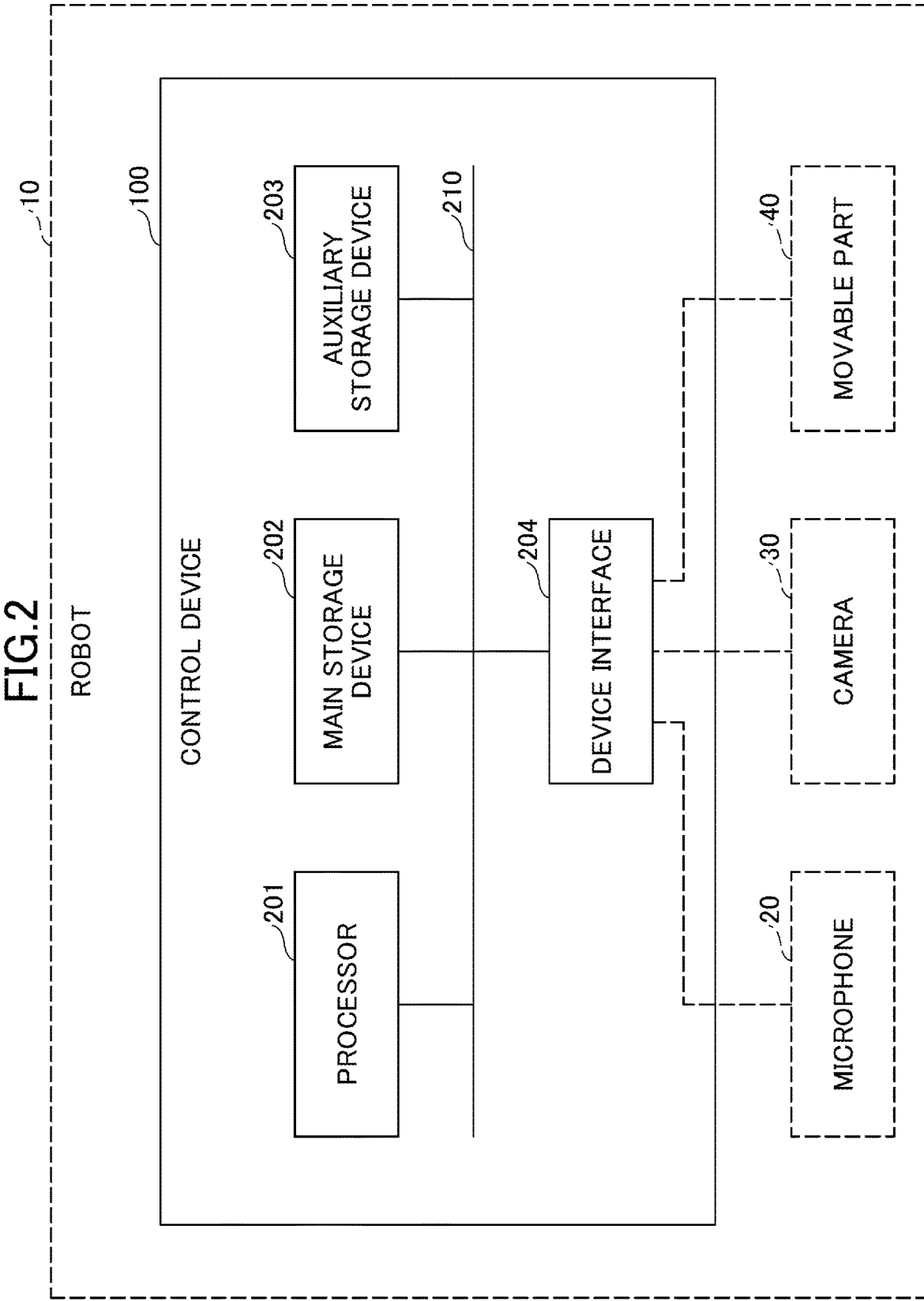
FIG. 2 is a diagram illustrating an example of a hardware configuration of a control device of the robot.

FIG. 2 is a diagram illustrating an example of the hardware configuration of the control device. The control device 100 includes a processor 201, a main storage device 202, an auxiliary storage device 203, and a device interface 204, and the control device 100 is implemented as a computer in which each of these components is connected through a bus 210.

In the example of FIG. 2, the control device 100 includes one of each component, but may include multiple units of the same component. In the example of FIG. 2, one control device is illustrated, but multiple control devices may be provided. Software (e.g., a control program) may be installed in the multiple control devices, and each of the multiple control devices may perform a different part of a process of the software. In this case, the multiple control devices may communicate with each other through a network interface or the like.

The processor 201 is an electronic circuit (a processing circuit or processing circuitry) including an arithmetic device. The processor 201 performs arithmetic processing based on data and a program input from each component of the control device 100, and outputs an arithmetic result or a control signal to each component or the like. Specifically, the processor 201 controls each component in the control device 100 by executing an operating system (OS), an application, and the like. Here, the processor 201 is not limited to a specific processing circuit, as long as the above-described processing can be performed. Here, the "processing circuit" may refer to one or more electronic circuits disposed on one chip, or one or more electronic circuits disposed on two or more chips or devices. If multiple electronic circuits are used, the electronic circuits may be communicated by wire or wireless.

The main storage device 202 is a storage device that stores electronic information such as instructions executed by the processor 201 and data. The electronic information stored in the main storage device 202 is directly read by the processor 201. The auxiliary storage device 203 is a storage device other than the main storage device 202. These storage devices indicate any electronic components that can store electronic information, and may be either a memory or a storage. Additionally, the memory may be either a volatile memory or a non-volatile memory. The memory that stores electronic information in the control device 100 may be implemented by the main storage device 202 or the auxiliary storage device 203.

The device interface 204 is an interface such as a universal serial bus (USB) that connects to the microphone 20, the camera 30, and the movable part 40.

<Functional Configuration of the Control Device>

Figure 3:
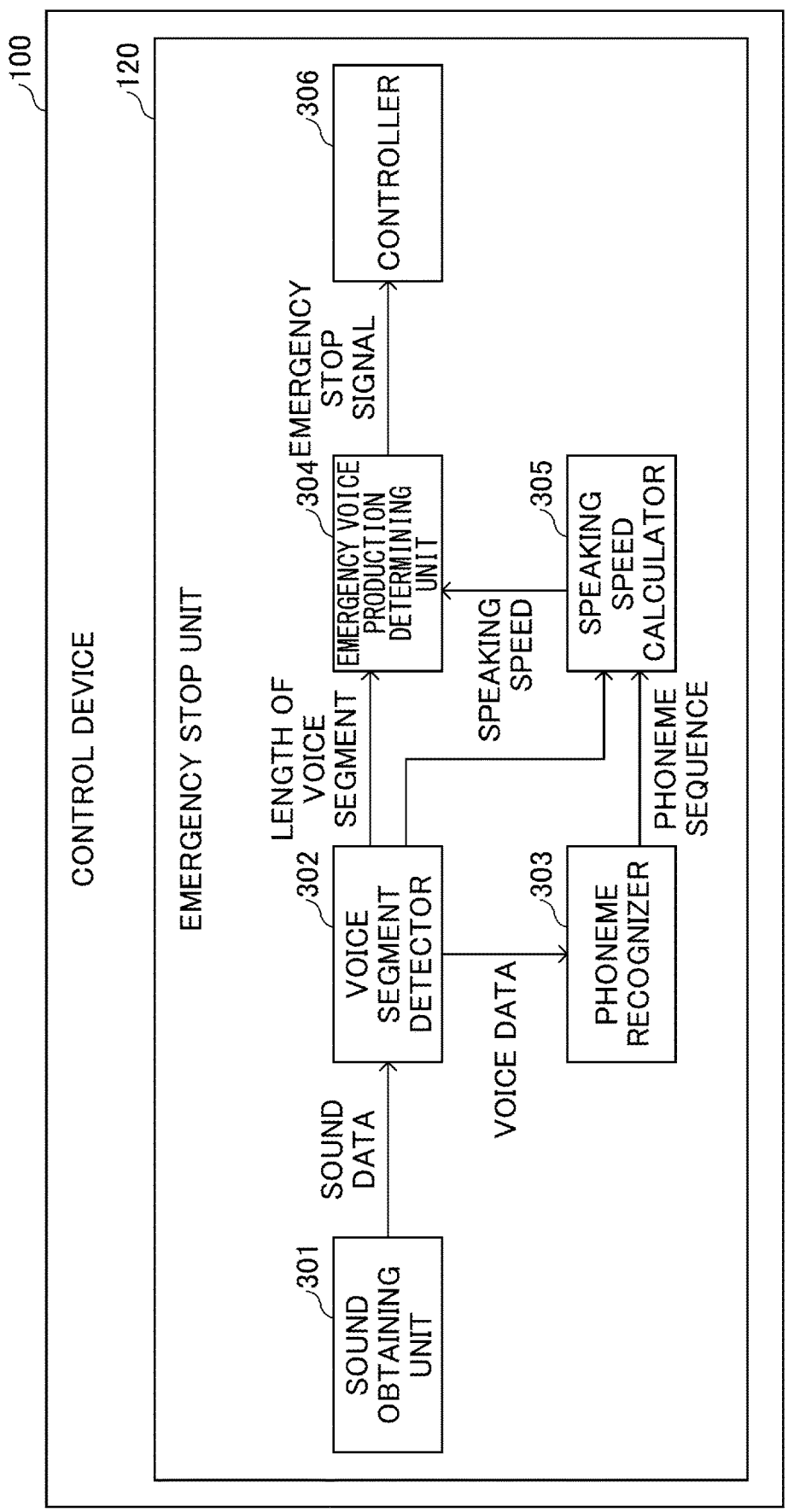
FIG. 3 is a first diagram illustrating an example of a functional configuration of an emergency stop unit of the control device.

Next, a functional configuration of the control device 100 will be described. As described above, the control device 100 functions as the executing unit 110 and the emergency stop unit 120. Here, the function of the emergency stop unit 120 will be described. FIG. 3 is a first diagram illustrating an example of the functional configuration of the emergency stop unit of the control device. The control device 100 functions as the emergency stop unit 120 by the processor 201 executing an emergency stop program, which is an example of the control program stored in the main storage device 202 or the auxiliary storage device 203.

As illustrated in FIG. 3, the emergency stop unit 120 includes a sound obtaining unit 301, a voice segment detector 302, a phoneme recognizer 303, an emergency voice production determining unit 304, a speaking speed calculator 305, and a controller 306.

The sound obtaining unit 301 obtains the sound data generated by the microphone 20 and outputs the sound data to the voice segment detector.

The voice segment detector 302 is an example of a detecting unit. The voice segment detector 302 receives the sound data output by the sound obtaining unit 301 and determines whether the received sound data is voice data. If it is determined that the received sound data is the voice data, the voice segment detector 302 outputs the determined voice data to the phoneme recognizer 303.

Additionally, if it is determined that the received sound data is the voice data, the voice segment detector 302 records the start time of the voice data. When it is determined that the received voice data is no longer the voice data, the voice segment detector 302 records the end time of the voice data. Consequently, the voice segment detector 302 calculates the length of the voice segment based on the recorded start time and the recorded end time of the voice data, and outputs the calculated length of the voice segment to the emergency voice production determining unit 304 and the speaking speed calculator 305.

The phoneme recognizer 303 receives the voice data output by the voice segment detector 302 and performs voice recognition processing on the received voice data to output a phoneme sequence to the speaking speed calculator 305.

The speaking speed calculator 305 receives the length of the voice segment output by the voice segment detector 302 and the phoneme sequence output by the phoneme recognizer 303, and calculates the number of phonemes per unit time based on the length of the voice segment and the length of the phoneme sequence. Additionally, the speaking speed calculator 305 outputs a calculated result as the speaking speed to the emergency voice production determining unit 304.

The emergency voice production determining unit 304 determines whether the following conditions (conditions for the emergency voice) are satisfied based on the length of the voice segment output by the voice segment detector 302 and the speaking speed output by the speaking speed calculator 305.

The speaking speed is a predetermined speed threshold or greater.

The length of the voice segment is a predetermined length threshold or less.

If it is determined that both of the above-described conditions are satisfied, the emergency voice production determining unit 304 outputs, to the controller 306, an emergency stop signal indicating that emergency voice production has been detected. If it is determined that one or both of the above-described conditions are not satisfied, the emergency voice production determining unit 304 does not output the emergency stop signal to the controller 306.

In response to receiving the emergency stop signal output by the emergency voice production determining unit 304, the controller 306 controls the movable part 40 to operate based on an emergency stop command, and emergently stops the robot 10.

<Flow of an Emergency Stop Process>

Figure 4:
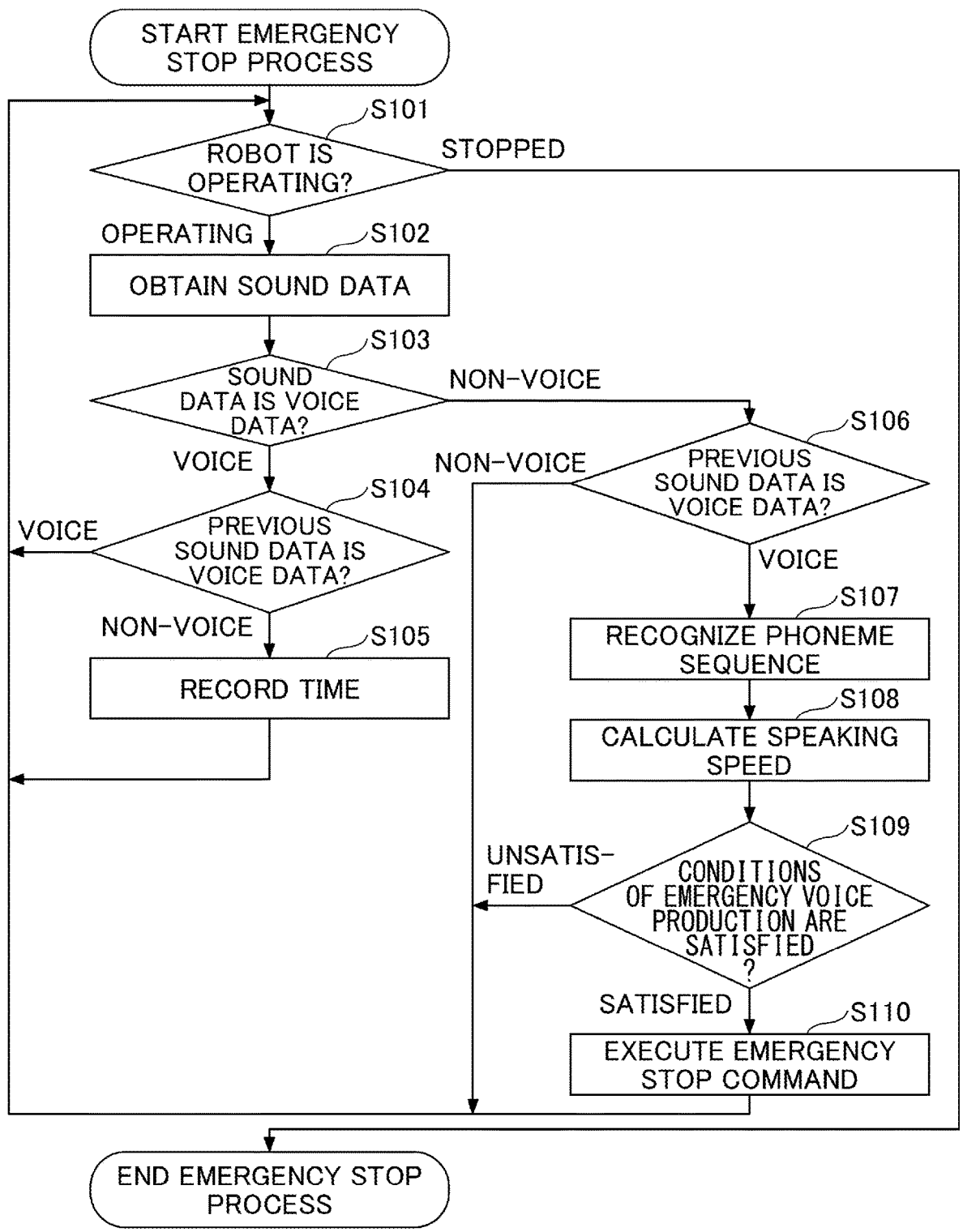
FIG. 4 is a first flowchart illustrating a flow of an emergency stop process performed by the emergency stop unit.

Next, a flow of an emergency stop process performed by by the emergency stop unit 120 will be described. FIG. 4 is a first flowchart illustrating the flow of the emergency stop process performed by the emergency stop unit.

In step S101, the emergency stop unit 120 determines whether the robot 10 is operating. In step S101, if it is determined that the robot 10 is stopped, the emergency stop process ends. In step S101, if it is determined that the robot 10 is operating, the process proceeds to step S102.

In step S102, the sound obtaining unit 301 obtains the sound data generated by the microphone 20 and stores the sound data in the main storage device 202. The sound obtaining unit 301 obtains sound data for a certain time period (for example, 10 ms or 20 ms) and proceeds to step S103.

In step S103, the voice segment detector 302 determines whether the sound data obtained by the sound obtaining unit 301 is the voice data. In step S103, if it is determined that the sound data is the voice data, the process proceeds to step S104.

In step S104, the voice segment detector 302 determines whether sound data previously obtained by the sound obtaining unit 301 is the voice data. In step S104, if it is determined that the previously obtained sound data is the voice data, the process returns to step S101. In step S104, if it is determined that the previously obtained sound data is the non-voice data, the process proceeds to step S105.

In step S105, the voice segment detector 302 records the current time or the time when the currently processed voice data (i.e., the sound data obtained in step S102) is stored in the main storage device 202, and returns to step S101. Here, a case, in which the previously obtained sound data is the non-voice data and the newly obtained sound data is voice data, indicates that the newly obtained voice data is a start point of the voice data (i.e., a start point of producing the voice). That is, the time recorded in step S105 is nothing else other than the start time of the voice data (i.e., the start time of producing the voice).

In step S103, if it is determined that the sound data is the non-voice data, the process proceeds to step S106. In step S106, the voice segment detector 302 determines whether the sound data previously obtained by the sound obtaining unit 301 is voice data. In step S106, if it is determined that the previously obtained sound data is the non-voice data, the process returns to step S101.

In step S106, if it is determined that the previously obtained sound data is the voice data, the process proceeds to step S107. Here, a case, in which the previously obtained sound data is voice data and the newly obtained sound data is the non-voice data, indicates that the newly obtained non-voice data is an end point of the voice data (i.e., an end point of producing the voice).

In step S107, the phoneme recognizer 303 recognizes the phoneme sequence with respect to the voice data stored in the main storage device 202 in the time period (i.e., the voice segment) from the start time of the voice data (i.e., the start time of producing the voice) to the current time (i.e., the end time of producing the voice).

In step S108, the voice segment detector 302 calculates the length of the time period (i.e., the voice production) from the start time of the voice data (i.e., the voice production) to the current time (the end time of the voice data) as the length of the voice segment. The speaking speed calculator 305 calculates the speaking speed by dividing the length of the phoneme sequence recognized by the phoneme recognizer 303 by the length of the voice segment calculated by the voice segment detector 302.

In step S109, the emergency voice production determining unit 304 determines whether the calculated speaking speed and the calculated length of the voice segment satisfy the following conditions.

The speaking speed is a predetermined speed threshold or greater.

The length of the voice segment is a predetermined length threshold or less.

In step S109, if the emergency voice production determining unit 304 determines that the above-described conditions are not satisfied, the process returns to step S101. In step S109, if the emergency voice production determining unit 304 determines that the above-described conditions are satisfied, the process proceeds to step S110.

In step S110, the controller 306 controls the movable part 40 to operate based on the emergency stop command and emergently stops the robot 10.

SUMMARY

As can be seen from the above description, in the first embodiment, there is focus on the fact that, when a situation, in which the operating robot is required to be stopped emergently, has occurred, the user typically shouts a short word quickly. The emergency stop unit of the control device according to the first embodiment determines that a situation, in which an emergency stop is required, has occurred if the following conditions are satisfied, and outputs the emergency stop signal.

The speaking speed is a predetermined speed threshold or greater.

The length of the voice segment is a predetermined length threshold or less.

Consequently, according to the emergency stop unit of the control device according to the first embodiment, if a situation, in which the operating robot is required to be stopped emergently, has occurred, the robot can be emergently stopped appropriately based on a user's voice instruction. As a result, the robot can be operated as intended by the user.

Second Embodiment

In the first embodiment described above, there is focus on the fact that the length of the voice segment and the speaking speed of the voice produced at once by a user when a situation, in which an emergency stop is required, has occurred. With respect to the above, if a situation, in which an emergency stop is required, has occurred, it is assumed that the user shouts with a relatively loud voice. Therefore, a second embodiment focuses on the sound pressure level in addition to the length of the voice segment and the speaking speed, in order to determine whether a situation, in which an emergency stop is required, has occurred. In the following, the second embodiment will be described focusing on the differences from the first embodiment described above.

<Functional Configuration of the Control Device>

Figure 5:
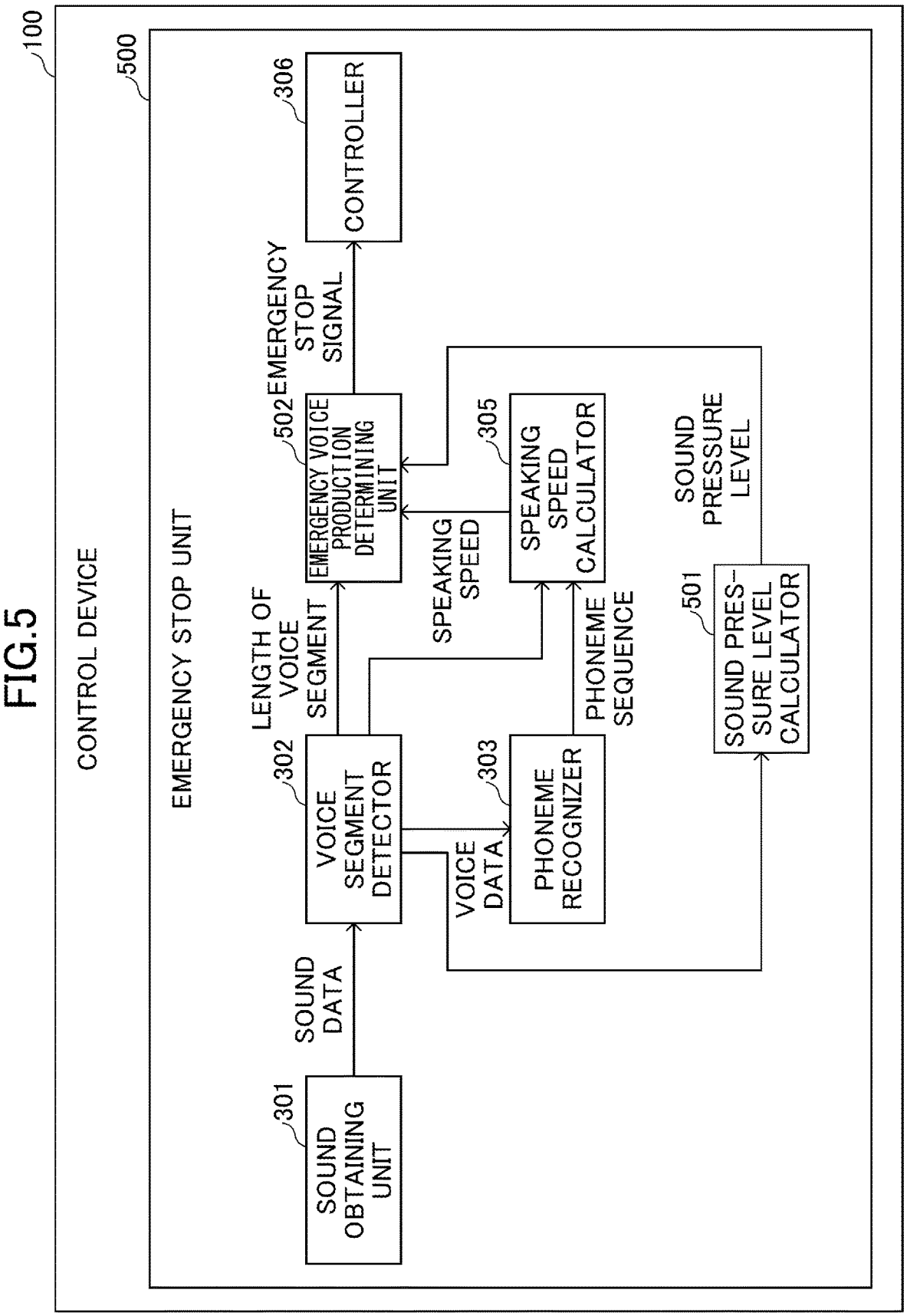
FIG. 5 is a second diagram illustrating an example of the functional configuration of the emergency stop unit of the control device.

First, a functional configuration of the emergency stop unit of the control device 100 according to the second embodiment will be described. FIG. 5 is a second diagram illustrating an example of the functional configuration of the emergency stop unit of the control device. The difference from the functional configuration illustrated in FIG. 3 is that, in an emergency stop unit 500 of the control device 100 according to the second embodiment, a sound pressure level calculator 501 is included and an emergency voice production determining unit 502 has a function different from the emergency voice production determining unit 304.

The sound pressure level calculator 501 receives the voice data output by the voice segment detector 302 and calculates the sound pressure level of the received voice data. Additionally, the sound pressure level calculator 501 outputs the calculated sound pressure level to the emergency voice production determining unit 502.

The emergency voice production determining unit 502 determines whether the following conditions are satisfied based on the length of the voice segment output by the voice segment detector 302, the speaking speed output by the speaking speed calculator 305, and the sound pressure level output by the sound pressure level calculator 501.

The speaking speed is a predetermined speed threshold or greater.

The length of the voice segment is a predetermined length threshold or less.

The sound pressure level is a predetermined pressure threshold or greater.

If it is determined that all of the above conditions are satisfied, the emergency voice production determining unit 502 outputs, to the controller 306, the emergency stop signal indicating that emergency voice production has been detected. If it is determined that any one or more of the above-described conditions are not satisfied, the emergency voice production determining unit 502 does not output the emergency stop signal to the controller 306.

As described, according to the emergency stop unit 500, by using the sound pressure level as the condition in addition to the length of the voice segment and the speaking speed, the accuracy of the determination in determining whether a situation, in which an emergency stop is required, has occurred can be improved.

<Flow of the Emergency Stop Process>

Figure 6:
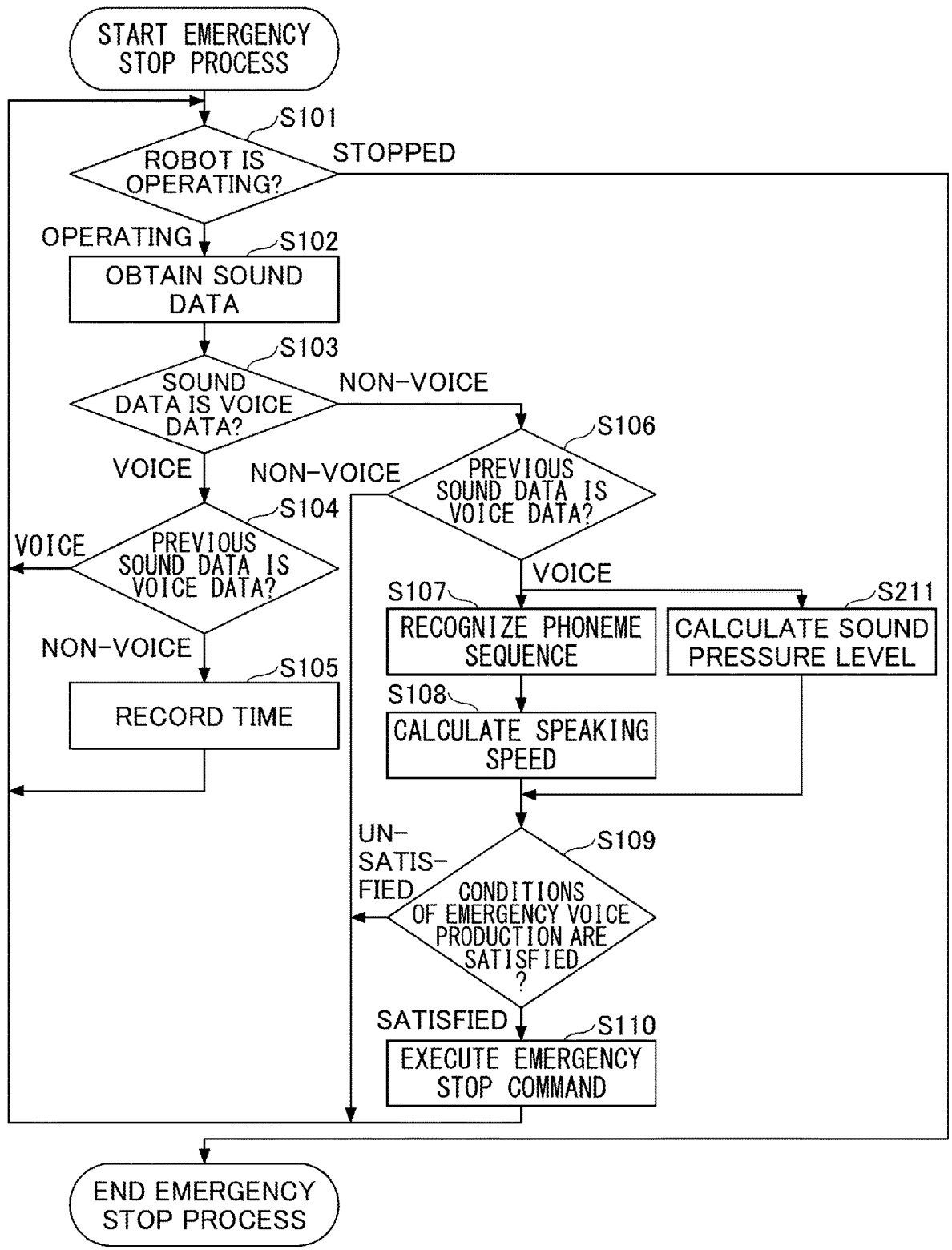
FIG. 6 is a second flowchart illustrating the flow of the emergency stop process performed by the emergency stop unit.

Next, a flow of the emergency stop process performed by the emergency stop unit 500 will be described. FIG. 6 is a second flowchart illustrating the flow of the emergency stop process performed by the emergency stop unit. The difference from the flowchart illustrated in FIG. 4 is step S211.

In step S211, the sound pressure level calculator 501 calculates the sound pressure level of the voice data stored in the main storage device 202 in the time period (i.e., the voice segment) from the start time of the voice data (the voice production) to the current time (i.e., the end time of the voice data (the voice production)).

Here, the sound pressure level calculated by the sound pressure level calculator 501 is an average value of the sound pressure level of the voice data stored in the main storage device 202 in the time period (i.e., the voice segment) from the start time of the voice data (the voice production) to the current time (i.e., the end time of the voice data (the voice production)). However, the sound pressure level calculated by the sound pressure level calculator 501 is not limited to the average value of the sound pressure level in the voice segment.

For example, the voice segment may be divided into specific intervals, the sound pressure levels are calculated for respective intervals, and the maximum or median value of the calculated sound pressure levels may be calculated as the sound pressure level.

Alternatively, the sound pressure level calculator 501 may calculate the difference between the average value (alternatively, the maximum value or the median value) of the sound pressure levels in the voice segment and the average (alternatively, the maximum value or the median value) of the sound pressure levels in the sound data in the non-voice segment immediately prior to the voice segment. This is because the volume of the voice produced by the user when a situation, in which an emergency stop is required, has occurred changes depending on a case in which the environmental sound around the robot 10 is loud and a case in which the environmental sound around the robot 10 is low and quiet.

SUMMARY

As can be seen from the above description, in the second embodiment, there is focus on the fact that, when a situation, in which the operating robot is required to be stopped emergently, has occurred, the user typically shouts a short word quickly and loudly. The emergency stop unit of the control device according to the second embodiment determines that a situation, in which an emergency stop is required, has occurred if the following conditions are satisfied, and outputs the emergency stop signal.

The speaking speed is a predetermined speed threshold or greater.
The length of the voice segment is a predetermined length threshold or less.
The sound pressure level is a predetermined pressure threshold or greater.

Consequently, according to the emergency stop unit of the control device according to the second embodiment, when a situation, in which the operating robot is required to be stopped emergently, has occurred, the robot can be emergently stopped appropriately based on the user's voice instruction. As a result, the robot can be operated as intended by the user.

Third Embodiment

The first embodiment described above focuses on the length of the voice segment and the speaking speed of the voice produced at once by the user when a situation, in which an emergency stop is required, has occurred. With respect to this, when a situation, in which an emergency stop is required, has occurred, a voice content that the user is likely to produce is limited. Additionally, there is a voice content that the user is unlikely to produce when a situation, in which an emergency stop is required, has occurred. Therefore, in a third embodiment, in determining whether a situation, in which an emergency stop is required, has occurred, a recognized phoneme sequence is focused in addition to the length of the voice segment and the speaking speed. In the following, the third embodiment will be described focusing on the differences from the above-described first embodiment.

<Functional Configuration of the Control Device>

Figure 7:
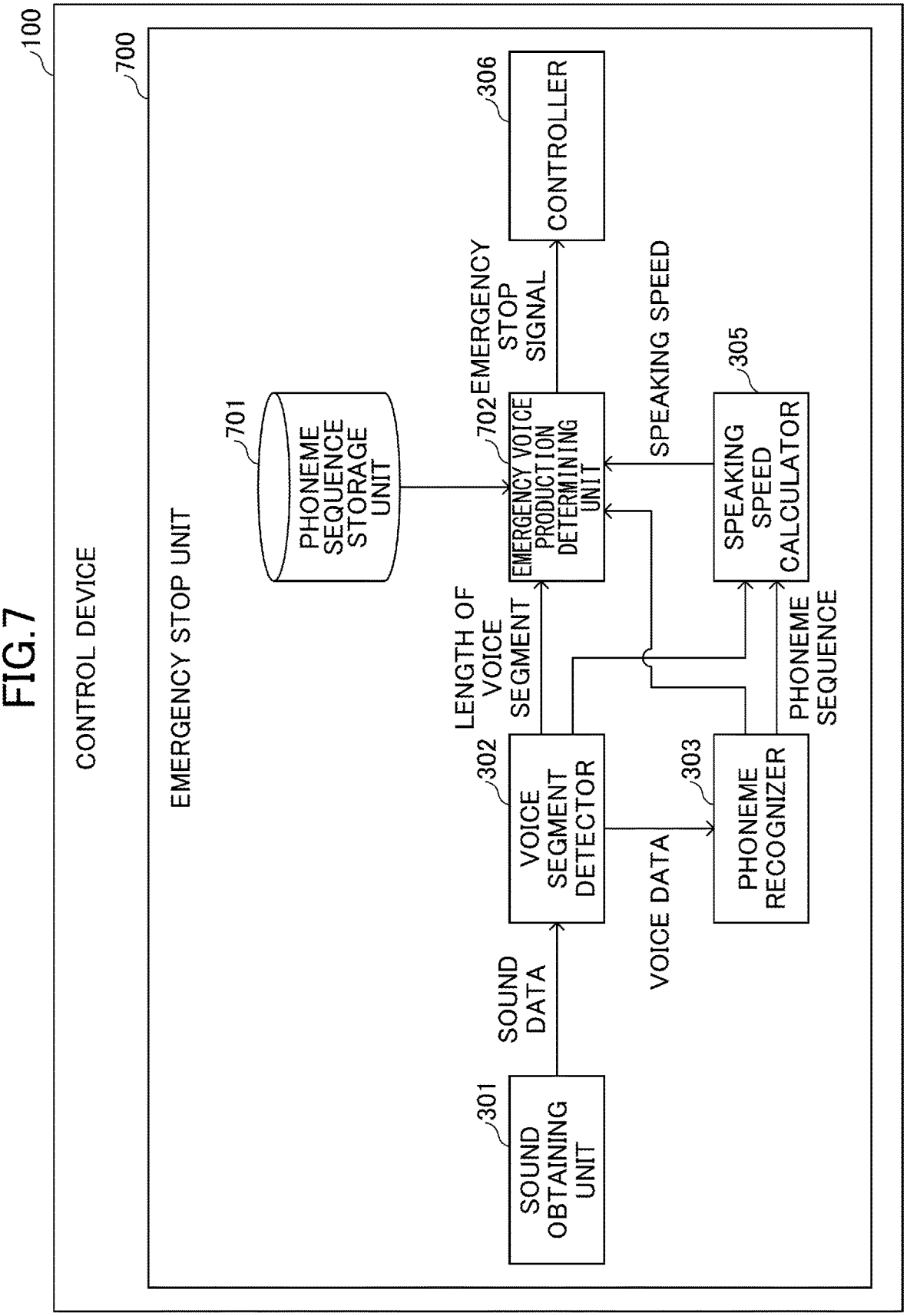
FIG. 7 is a third diagram illustrating an example of the functional configuration of the emergency stop unit of the control device.

First, a functional configuration of the emergency stop unit of the control device 100 according to the third embodiment will be described. FIG. 7 is a third diagram illustrating an example of the functional configuration of the emergency stop unit of the control device. A difference from the functional configuration illustrated in FIG. 3 is that the emergency voice production determining unit 702 has a function different from the emergency voice production determining unit 304.

The emergency voice production determining unit 702 determines whether the following conditions are satisfied based on the length of the voice segment output by the voice segment detector 302, the speaking speed output by the speaking speed calculator 305, and the phoneme sequence output by the phoneme recognizer 303. Here, it is assumed that a phoneme sequence storage unit 701 stores a set of phoneme sequences of voice contents that the user is likely to produce when a situation, in which an emergency stop is required, has occurred.

The speaking speed is a predetermined speed threshold or greater.
The length of the voice segment is a predetermined length threshold or less.
The phoneme sequence contains a phoneme sequence included in the set of the predetermined phoneme sequences stored in the phoneme sequence storage unit 701.

If it is determined that all of the above conditions are satisfied, the emergency voice production determining unit 702 outputs, to the controller 306, the emergency stop signal indicating that emergency voice production is detected. If it is determined that any one or more of the above-described conditions are not satisfied, the emergency voice production determining unit 702 does not output the emergency stop signal to the controller 306.

The phoneme sequence storage unit 701 may store a set of phoneme sequences of voice contents that the user is unlikely to produce when a situation, in which an emergency stop is required, has occurred. In such a case, the emergency voice production determining unit 702 determines whether the following conditions are satisfied.

The speaking speed is a predetermined speed threshold or greater.
The length of the voice segment is a predetermined length threshold or less.
The phoneme sequence does not include a phoneme sequence included in the set of predetermined phoneme sequences stored in the phoneme sequence storage unit 701.

If it is determined that all of the above conditions are satisfied, the emergency voice production determining unit 702 outputs, to the controller 306, the emergency stop signal indicating that emergency voice production is detected. If it is determined that any one or more of the above-described conditions are not satisfied, the emergency voice production determining unit 702 does not output the emergency stop signal to the controller 306.

SUMMARY

As can be seen from the above description, in the third embodiment, there is focus on the fact that, when a situation, in which the operating robot 10 is required to be stopped emergently, has occurred, the user typically produces a specific short word quickly. The emergency stop unit of the control device according to the third embodiment determines that a situation, in which an emergency stop is required, has occurred if the following conditions are satisfied, and outputs the emergency stop signal.

The speaking speed is a predetermined speed threshold or greater.
The length of the voice segment is a predetermined length threshold or less.
The phoneme sequence contains (or does not contain) a predetermined phoneme sequence.

Consequently, according to the emergency stop unit of the control device according to the third embodiment, when a situation, in which the operating robot is required to be stopped emergently, has occurred, the robot can be emergently stopped appropriately based on the user's voice instruction. Additionally, a case, in which an emergency stop is performed despite a situation, in which an emergency stop is required, does not occur, can be avoided. As a result, the robot can be operated as intended by the user.

Fourth Embodiment

The first embodiment described above focuses on the length of the voice segment and the speaking speed of the voice that the user produces at once when a situation, in which an emergency stop is required, has occurred. With respect to this, when a situation, in which an emergency stop is required, has occurred, the user is likely to produce the voice in the direction toward the robot. Therefore, in a fourth embodiment, in determining whether a situation, in which an emergency stop is required, has occurred, the direction in which the user produces the voice is focused in addition to the length of the voice segment and the speaking speed. In the following, the fourth embodiment will be described focusing on the differences from the first embodiment above.

<Functional Configuration of the Control Device>

Figure 8:
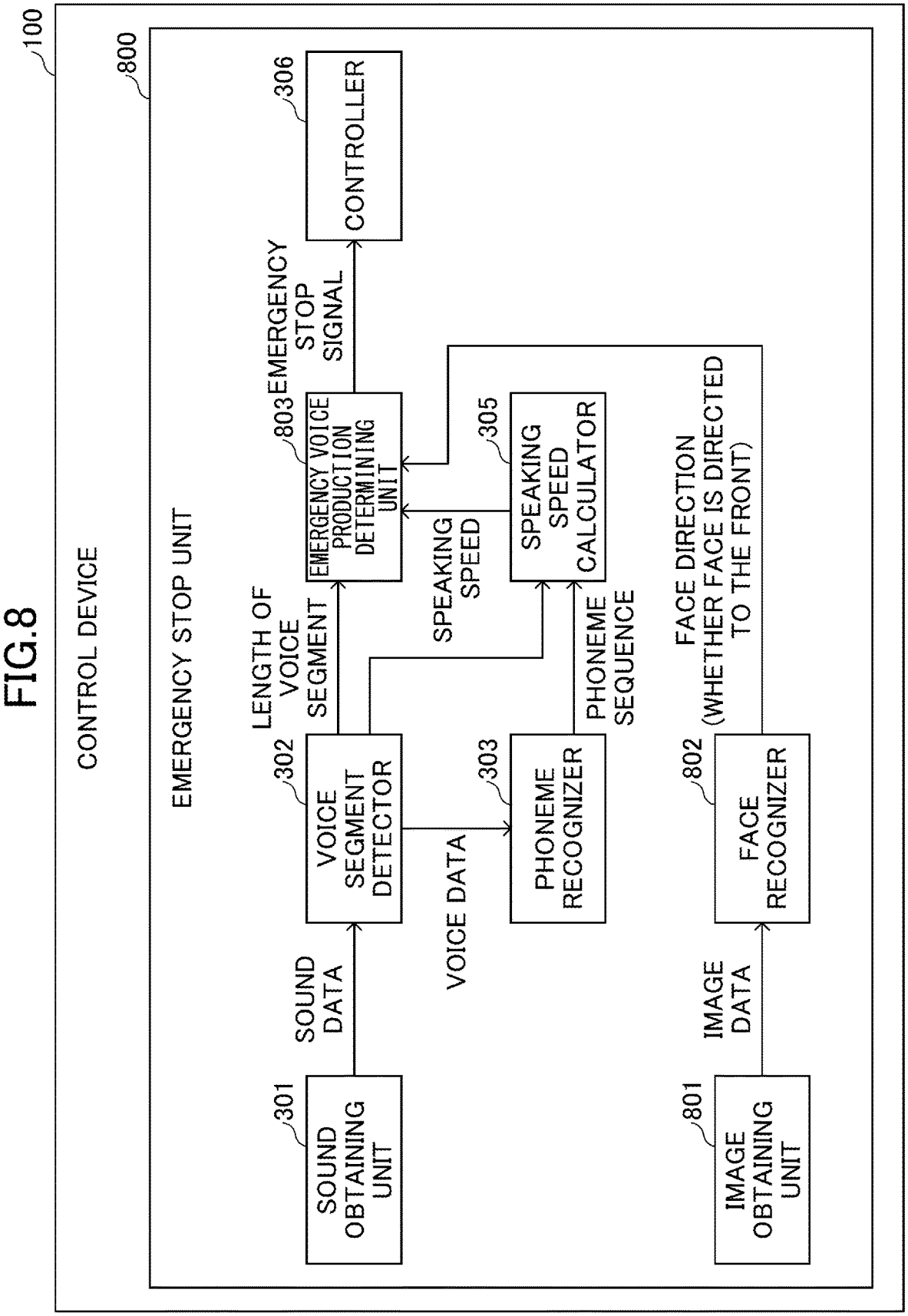
FIG. 8 is a fourth diagram illustrating an example of the functional configuration of the emergency stop unit of the control device.

First, a functional configuration of the emergency stop unit of the control device 100 according to the fourth embodiment will be described. FIG. 8 is a fourth diagram illustrating an example of the functional configuration of the emergency stop unit of the control device. The difference from the functional configuration illustrated in FIG. 3 is that, in an emergency stop unit 800 of the control device 100 according to the fourth embodiment, an image obtaining unit 801 and a face recognizer 802 are included, and the emergency voice production determining unit 803 has a function different from the emergency voice production determining unit 304.

The image obtaining unit 801 obtains image data generated by the camera 30 and outputs the image data to the face recognizer 802.

The face recognizer 802 is an example of a recognizing unit. The face recognizer 802 receives the image data output by the image obtaining unit 801, detects a face area from the received image data, and recognizes a face direction based on the detected face area. The face recognizer 802 determines whether the recognized face direction is toward the front and outputs a determined result of the recognized face direction (or whether the recognized face direction is toward the front) to the emergency voice production determining unit 803. Face recognition can be achieved by known methods.

The emergency voice production determining unit 803 determines whether the following conditions are satisfied based on the length of the voice segment output by the voice segment detector 302, the speaking speed output by the speaking speed calculator 305, and the determined result output by the face recognizer 802.

The speaking speed is a predetermined speed threshold or greater.

The length of the voice segment is a predetermined length threshold or less.

The face is directed toward the front.

If it is determined that all of the above conditions are satisfied, the emergency voice production determining unit 803 outputs, to the controller 306, the emergency stop signal indicating that emergency voice production is detected. If it is determined that any one or more of the above-described conditions are not satisfied, the emergency voice production determining unit 803 does not output the emergency stop signal to the controller 306.

As described, according to the emergency stop unit 800, by using the face direction as the condition in addition to the length of the voice segment and the speaking speed, the accuracy of the determination in determining whether a situation, in which an emergency stop is required, has occurred can be improved.

<Flow of the Emergency Stop Process>

Figure 9:
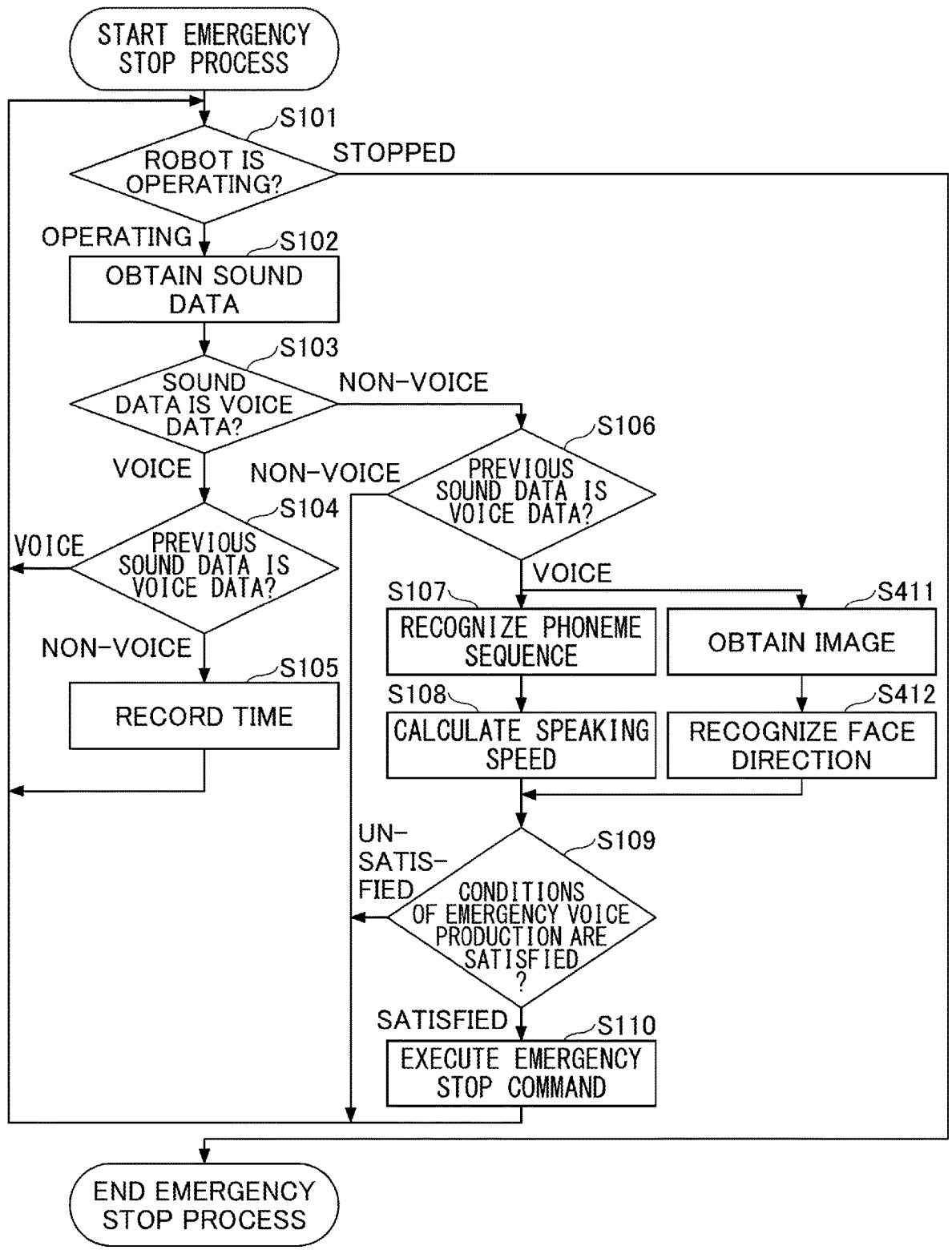
FIG. 9 is a third flowchart illustrating the flow of the emergency stop process performed by the emergency stop unit.

Next, a flow of the emergency stop process performed by the emergency stop unit 800 will be described. FIG. 9 is a third flowchart illustrating the flow of the emergency stop process performed by the emergency stop unit. The differences from the flowchart illustrated in FIG. 4 are steps S411 and S412.

In step S411, the image obtaining unit 801 obtains the image data stored in the main storage device 202 during the time period (i.e., the voice segment) from the start time of the voice data (the voice production) to the current time (i.e., the end time of the voice data (the voice production)).

In step S412, the face recognizer 802 detects the face area from the image data obtained in step S411 and recognizes the face direction based on the detected face area. Additionally, the face recognizer 802 determines whether the recognized face direction is toward the front.

First Modified Example

In the above description, the face recognizer 802 detects the face area from the image data obtained by the image obtaining unit 801 and recognizes the face direction based on the detected face area. However, it is conceivable that multiple users are included in the image data obtained by the image obtaining unit 801 and multiple face areas are detected. Thus, in a first modified example, the sound obtaining unit 301 identifies the incoming direction of the sound (i.e., the direction in which the user producing the voice is positioned), and the face recognizer 802 recognizes the face direction of the face area positioned in the identified incoming direction among the multiple face areas included in the image data.

Consequently, a situation, in which a face direction of a user different from the user producing the voice is determined, can be avoided. Here, in the first modified example, it is assumed that multiple microphones are provided, and the sound obtaining unit 301 can identify the incoming direction of the sound (i.e., the direction in which the user producing the sound is positioned) based on the sound data generated in the multiple microphones. The incoming direction of the sound may be determined by known methods.

Figure 10:
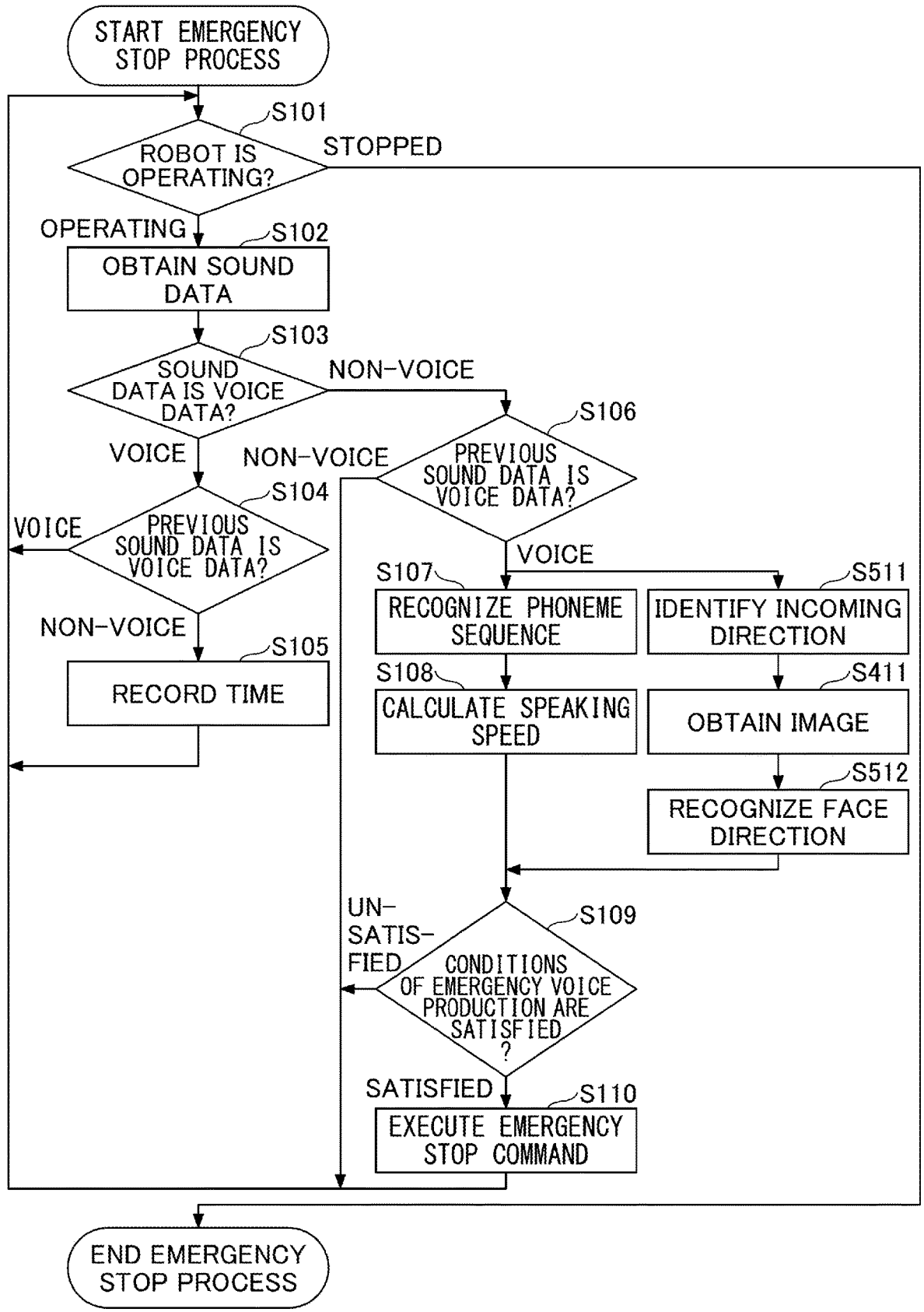
FIG. 10 is a fourth flowchart illustrating the flow of the emergency stop process performed by the emergency stop unit.

FIG. 10 is a fourth flowchart illustrating a flow of the emergency stop process performed by the emergency stop unit. The differences from the third flowchart illustrated in FIG. 9 are step S511 and step S512.

In step S511, the sound obtaining unit 301 identifies the incoming direction of the sound (i.e., the direction in which the user producing the voice is positioned).

In step S512, in the image data obtained in step S411, the face recognizer 802 detects the face area in the incoming direction identified by the sound obtaining unit 301 (i.e., the direction in which the user producing the voice is positioned), and recognizes the face direction based on the detected face area. Additionally, the face recognizer 802 determines whether the recognized face direction is toward the front.

As described, according to the emergency stop unit 800, by using the face direction recognized from the face area in the incoming direction of the sound as a condition in addition to the length of the voice segment and the speaking speed, the accuracy of the determination in determining whether a situation, in which an emergency stop is required, has occurred can be further improved.

Second Modified Example

The above description assumes that the microphone 20 and the camera 30 are integrally configured with the robot 10. However, it is also conceivable that either or both of the microphone 20 and the camera 30 may be configured separately from the robot 10.

In such a case, a direction in which the user is to be directed when the user produces the voice is predetermined for the control device 100. Then, the face recognizer 802 detects the face area of the incoming direction of the sound (i.e., the direction in which the user producing the sound is positioned) from the image data, and determines whether the recognized face direction is in the predetermined direction when recognizing the face direction based on the detected face area.

The emergency voice production determining unit 803 determines whether the following conditions are satisfied based on the length of the voice segment output by the voice segment detector 302, the speaking speed output by the speaking speed calculator 305, and the determined result output by the face recognizer 802.

The speaking speed is a predetermined speed threshold or greater.

The length of the voice segment is a predetermined length threshold or less.

The face is directed in a predetermined direction.

If it is determined that all of the above conditions are satisfied, the emergency voice production determining unit 803 outputs, to the controller 306, the emergency stop signal indicating that emergency voice production is detected. If it is determined that any one or more of the above-described conditions are not satisfied, the emergency voice production determining unit 803 does not output the emergency stop signal to the controller 306.

As described above, according to the emergency stop unit 800, by using the face direction recognized from the face area in the incoming direction of the sound (i.e., the predetermined face direction) as a condition, in addition to the length of the voice segment and the speaking speed, the accuracy of the determination in determining whether a situation, in which an emergency stop is required, has occurred can be improved.

SUMMARY

As can be seen from the above description, in the fourth embodiment, there is focus on the fact that when a situation, in which the operating robot is required to be stopped emergently, has occurred, the user typically shouts a short word quickly in a predetermined direction. The emergency stop unit of the control device according to the fourth embodiment determines that a situation, in which an emergency stop is required, has occurred if the following conditions are satisfied and outputs the emergency stop signal.

The speaking speed is a predetermined speed threshold or greater.

The length of the voice segment is a predetermined length threshold value or less.

The face is directed in a predetermined direction.

Consequently, according to the emergency stop unit of the control device according to the fourth embodiment, a situation, in which the robot is stopped emergently by the voice that is not directed in a predetermined direction, can be avoided. That is, if a situation, in which an emergency stop is required, has occurred, the robot can be emergently stopped appropriately based on the user's voice instruction. As a result, the robot can be emergently stopped as intended by the user.

Fifth Embodiment

In the first embodiment described above, a case, in which it is determined whether a situation, in which an emergency stop is required, has occurred, has been described. With respect to this, in a fifth embodiment, it is determined whether a situation, in which a normal stop is required, has occurred, in addition to determining whether a situation, in which an emergency stop is required, has occurred.

Here, the emergency stop indicates stopping the power supply for the robot 10 based on the emergency stop command. However, a brake or lock may be applied to the movable part of the robot 10 just before the power supply is stopped. Alternatively, a brake or lock may be applied to the movable part of the robot 10 before or after the power supply is stopped by using a mechanism that does not use the power.

With respect to the above, the normal stop indicates fixing the movable part of the robot 10 at the current position so that the movable part does not move unless an external force is applied while maintaining the power supply for the robot 10 based on a normal stop command. Methods of fixing the movable part include the following methods and the like.

a) A method of fixing the movable part by controlling a position of the movable part to return to a position where the movable part is positioned when the normal stop command has been issued, if the movable part is moved by an external force b) A method of fixing the movable part by controlling to remain at a position where, if the movable part is moved by the external force, the movable part is positioned when the external force is no longer applied c) A method of providing a brake and fixing a position with the brake Here, stopping the power supply includes stopping the power supply for all the elements of the robot 10 and stopping the power supply for elements related to the operation of the robot 10.

In the following, the fifth embodiment will be described focusing on the differences from the first embodiment described above.

<Functional Configuration of the Control Device>

Figure 11:
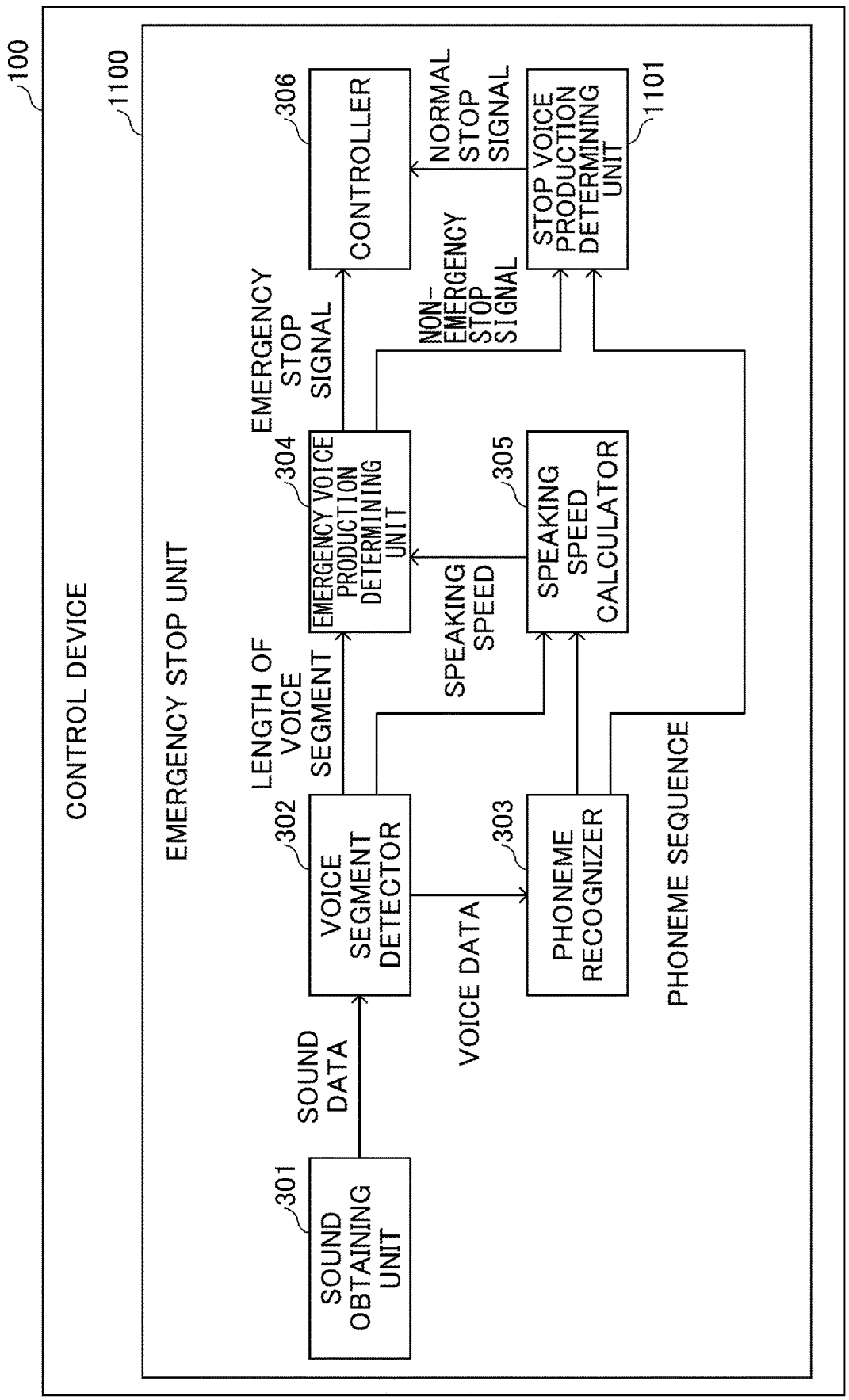
FIG. 11 is a fifth diagram illustrating an example of the functional configuration of the emergency stop unit of the control device.

First, a functional configuration of the emergency stop unit of the control device 100 according to the fifth embodiment will be described. FIG. 11 is a fifth diagram illustrating an example of the functional configuration of the emergency stop unit of the control device. A difference from the functional configuration illustrated in FIG. 3 is that an emergency stop unit 1100 includes a stop voice production determining unit 1101.

The stop voice production determining unit 1101 receives a signal (i.e., a non-emergency stop signal), indicating being not the emergency voice production, that is output from the emergency voice production determining unit 304 when it is determined that a situation, in which an emergency stop is required, does not occur. Additionally, the stop voice production determining unit 1101 receives the phoneme sequence output from the phoneme recognizer 303.

Further, in response to receiving the signal indicating being not the emergency voice production from the emergency voice production determining unit 304, the stop voice production determining unit 1101 determines whether the phoneme sequence received from the phoneme recognizer 303 includes a predetermined phoneme sequence related to a stop. If it is determined that the predetermined phoneme sequence related to a stop is included, the stop voice production determining unit 1101 outputs a normal stop signal to the controller 306 and normally stops the robot 10.

<Flow of the Emergency Stop Process>

Figure 12:
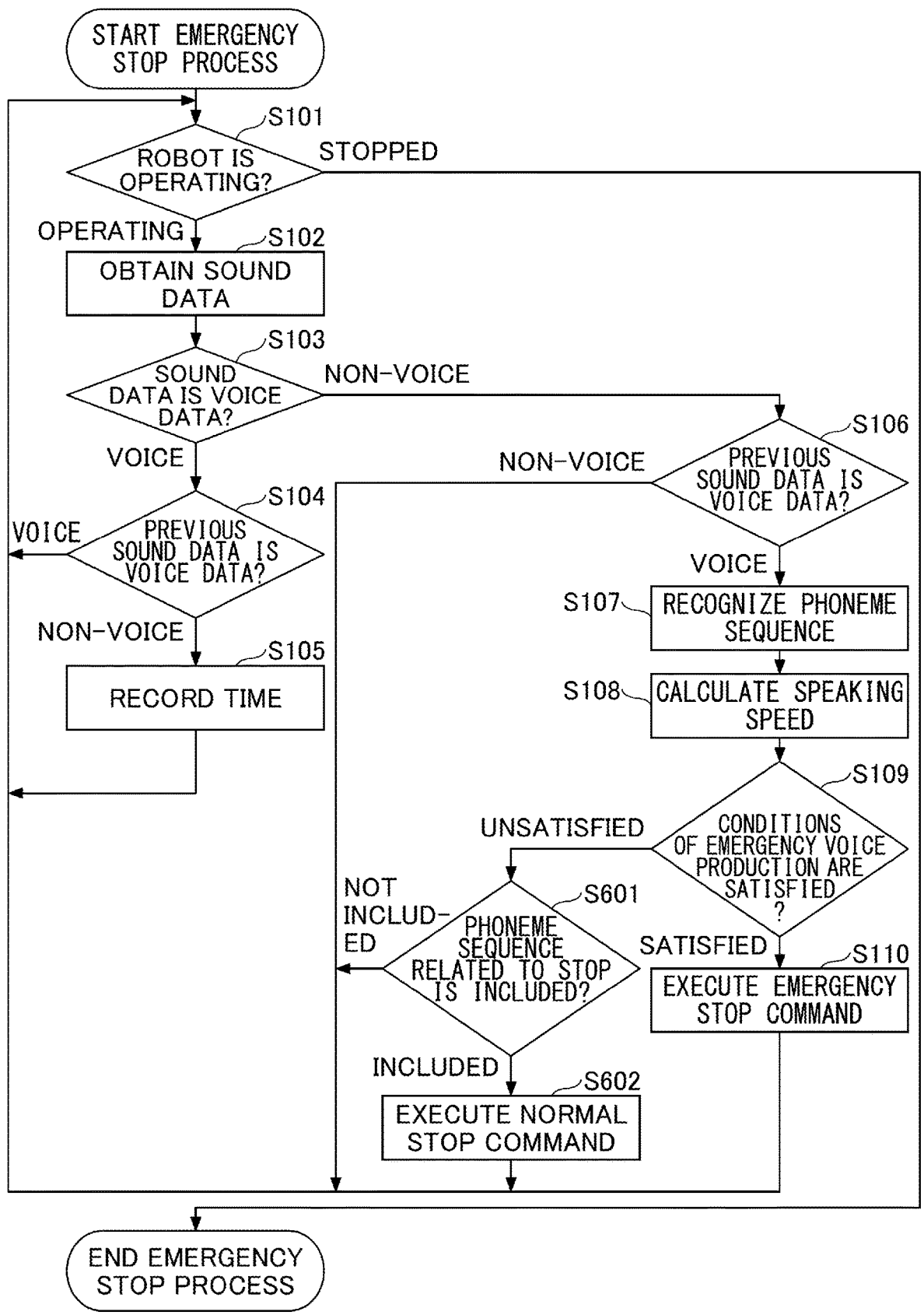
FIG. 12 is a fifth flowchart illustrating the flow of the emergency stop process performed by the emergency stop unit.

Next, a flow of the emergency stop process performed by the emergency stop unit 1100 will be described. FIG. 12 is a fifth flowchart illustrating the flow of the emergency stop process performed by the emergency stop unit. The differences from the flowchart illustrated in FIG. 4 are steps S601 and S602.

In step S601, the stop voice production determining unit 1101 receives the phoneme sequence from the phoneme recognizer 303 and determines whether the received phoneme sequence contains a phoneme sequence related to a stop.

In step S601, if it is determined that the received phoneme sequence does not contain a phoneme sequence related to a stop, the process returns to step S101. In step S601, if it is determined that the received phoneme sequence contains a phoneme sequence related to a stop, it is determined that a situation, in which a normal stop is required, has occurred and the process then proceeds to step S602.

In step S602, the stop voice production determining unit 1101 outputs the normal stop signal to the controller 306. The controller 306 controls the movable part 40 to operate based on a normal stop command and normally stops the robot 10.

SUMMARY

As can be seen from the above description, the emergency stop unit of the control device according to the fifth embodiment normally stops the robot if the phoneme sequence contains a phoneme sequence indicating a normal stop, even if it is determined that a situation, in which an emergency stop is required, does not occur.

Consequently, according to the emergency stop unit of the control device according to the fifth embodiment, the robot can be stopped by multiple stop methods (i.e., an emergency stop method or a normal stop method) including a stop method other than the emergency stop.

Sixth Embodiment

In the first embodiment described above, the length of the voice segment and the speaking speed of the voice that the user produces at once when a situation, in which an emergency stop is required, has occurred are focused. With respect to this, if a situation, in which an emergency stop is required, has occurred, it is assumed that the user produces the same word, the same word fragment, or the same phrase repeatedly. For example, "mate mate mate" in Japanese ("wait, wait, wait"), "stop, stop, stop", "abunai abunai abunai" in Japanese ("danger, danger, danger"), and "cho cho cho" in Japanese ("hey, hey, hey") are used. Therefore, in the sixth embodiment, in determining whether a situation, in which an emergency stop is required, has occurred, repetition of the same word is focused. In the following, the sixth embodiment will be described focusing on the differences from the first embodiment described above.

<Functional Configuration of the Control Device>

Figure 13:
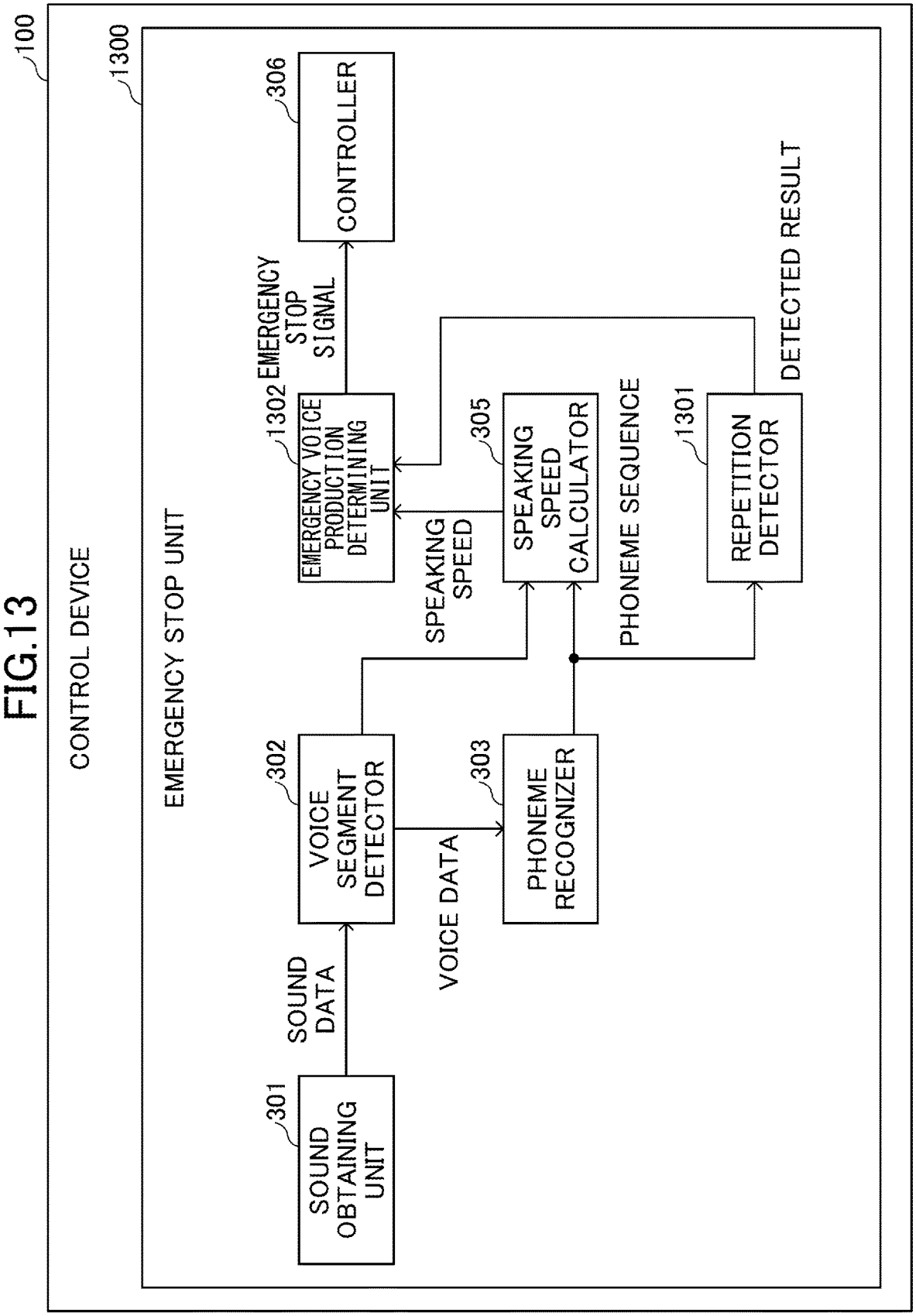
FIG. 13 is a sixth diagram illustrating an example of the functional configuration of the emergency stop unit of the control device.

First, a functional configuration of the emergency stop unit of the control device 100 according to the sixth embodiment will be described. FIG. 13 is a sixth diagram illustrating an example of the functional configuration of the emergency stop unit of the control device. The difference from the functional configuration illustrated in FIG. 3 is that, in an emergency stop unit 1300 of the control device 100 according to the sixth embodiment, a repetition detector 1301 is included and an emergency voice production determining unit 1302 has a function different from the emergency voice production determining unit 304.

The repetition detector 1301 receives the phoneme sequence output by the phoneme recognizer 303 and detects repeating portions in the received phoneme sequence. Additionally, the repetition detector 1301 outputs a detected result to the emergency voice production determining unit 1302.

Here, a processing example of the repetition detector is described as follows by using the programming language "Python", for example.

def detect(input):

```
R = [ ]
for w in range (2, len (input) / /2+1) :
    for b in range (len (input) -w+1) :
        s = input [b:b+w]
        R.append (s*2)
for r in R:
    if r in input:
        return True
return False
```

In the above description, the return value "True" indicates that repeating portions are detected in the phoneme sequence input into the input. The return value "False" indicates that no repetition is detected in the phoneme sequence input into the input.

Here, if the phoneme recognizer has a function to grammatically specify a phoneme sequence to be recognized, instead of recognizing any phoneme sequence, the repeating portions can be detected by describing all repetitions of the expected phoneme sequences in accordance with grammar. In this case, the repetition detector 1301 may not be required. An example of the phoneme recognizer implemented by using the grammar is a recognition grammar toolkit for Julius. By using a phoneme as the unit of recognition instead of a word, the phoneme recognizer according to the present embodiment may be provided.

The emergency voice production determining unit 1302 determines whether the following conditions are satisfied based on the speaking speed output by the speaking speed calculator 305 and the detected result output by the repetition detector 1301.

The speaking speed is a predetermined speed threshold or greater.

The phoneme sequence contains repeating portions.

If it is determined that both of the above conditions are satisfied, the emergency voice production determining unit 1302 outputs, to the controller 306, the emergency stop signal indicating that emergency voice production is detected. If it is determined that any one or more of the above-described conditions are not satisfied, the emergency voice production determining unit 1302 does not output the emergency stop signal to the controller 306.

As described, according to the emergency stop unit 1300, by using a condition that the phoneme sequence contains repeating portions in addition to the speaking speed being greater than or equal to a predetermined speed threshold, it can be determined with high accuracy whether a situation, in which an emergency stop is required, has occurred.

<Flow of the Emergency Stop Process>

Figure 14:
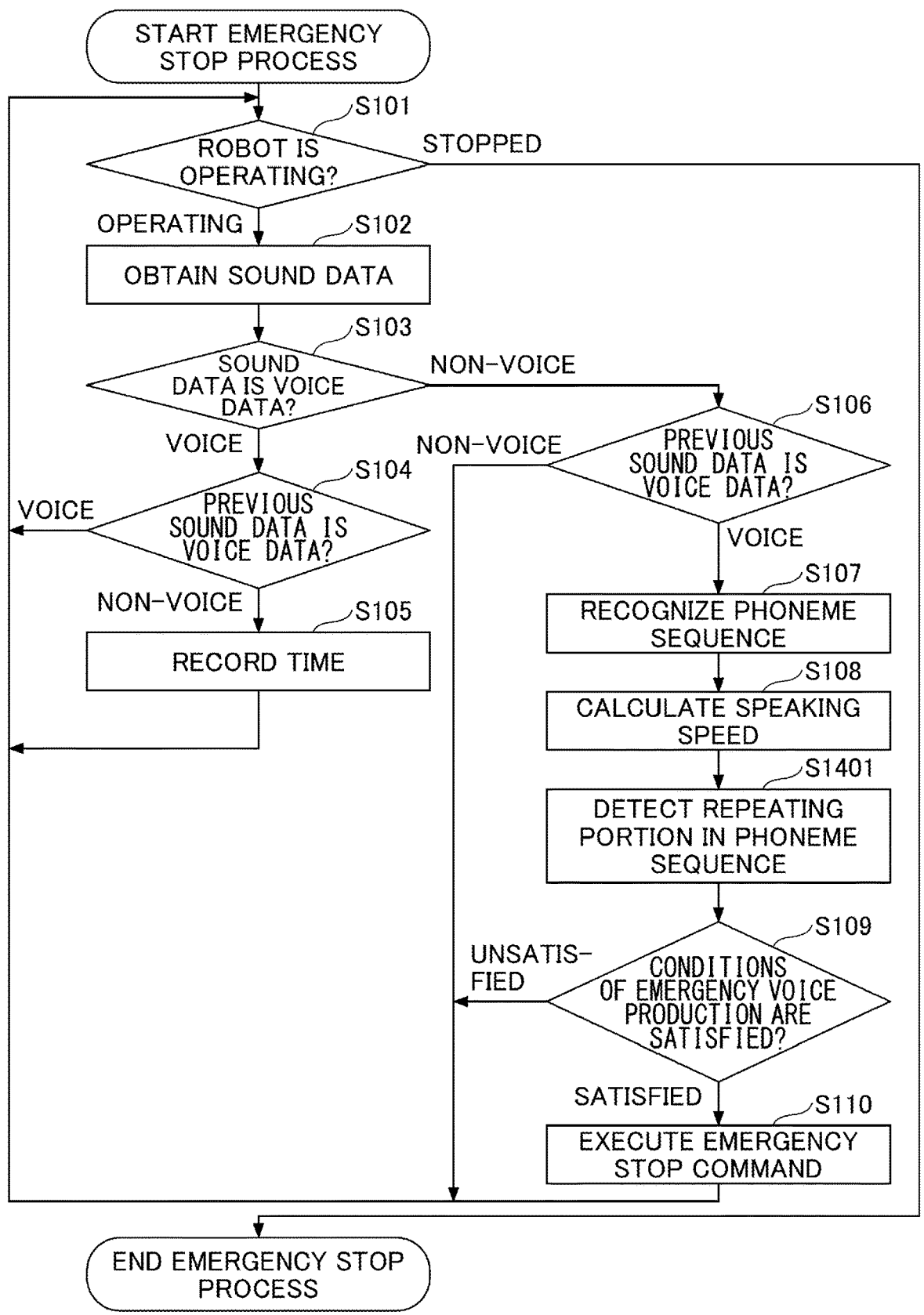
FIG. 14 is a sixth flowchart illustrating the flow of the emergency stop process performed by the emergency stop unit.

Next, a flow of the emergency stop process performed by the emergency stop unit 1300 will be described. FIG. 14 is a sixth flowchart illustrating the flow of the emergency stop process performed by an emergency stop unit. The difference from the flowchart illustrated in FIG. 4 is step S1401.

In step S1401, the repetition detector 1301 detects repeating portions in the phoneme sequence recognized in step S107.

Here, the repetition detector 1301 detects whether a repetition of a phoneme sequence longer or equal to a predetermined length appears in the phoneme sequence recognized in step S107.

SUMMARY

As can be seen from the above description, in the sixth embodiment, there is focus on the fact that, when a situation, in which the operating robot is required to be stopped emergently, has occurred, the user typically produces a short word repeatedly and quickly. The emergency stop unit of the control device according to the sixth embodiment determines that a situation, in which an emergency stop is required, has occurred if the following conditions are satisfied, and outputs the emergency stop signal.

The speaking speed is a predetermined speed threshold or greater.
Repeating portions are included in a phoneme sequence corresponding to the user's voice.

Consequently, according to the emergency stop unit of the control device according to the sixth embodiment, when a situation, in which the operating robot is required to be stopped emergently, has occurred, the robot can be emergently stopped appropriately based on the user's voice instruction. As a result, the robot can be operated as intended by the user.

In the present embodiment, in addition to the speaking speed output by the speaking speed calculator 305 and the detected result output by the repetition detector 1301, the emergency voice production determining unit 1302 may detect the emergency voice by using the length of the voice segment output by the voice segment detector 302. In this case, if it is determined that all of the following conditions are satisfied, the emergency voice production determining unit 1302 outputs, to the controller 306, the emergency stop signal indicating that emergency voice production is detected.

The speaking speed is a predetermined speed threshold or greater.
The length of the voice segment is a predetermined length threshold or less.
The phoneme sequence contains repeating portions.

Seventh Embodiment

In the sixth embodiment described above, there is focus on the fact that the speaking speed of the voice that the user produces at once when a situation, in which an emergency stop is required, has occurred, and the repeating portions in the phoneme sequence corresponding to the voice are focused. With respect to this, it is assumed that the sound pressure level rises over time while repeatedly producing the same word or phrase in a case where a situation, in which an emergency stop is required, has occurred in conjunction with a case where a level of danger to the user increases over time. For example, if clothes are becoming entangled into a rotary machine but there are a few seconds until the clothes become fully entangled, it is assumed that the voice will be gradually louder. Therefore, in a seventh embodiment, in determining whether a situation, in which an emergency stop is required, has occurred, an increase in the sound pressure level is focused in addition to the speaking speed and the repetition of the same word. In the following, the seventh embodiment will be described focusing on the differences from the sixth embodiment described above. In order to simplify the description, the following description assumes that a word is repeated. However, a word fragment or a string of words may be repeated instead of a word.

<Functional Configuration of the Control Device>

Figure 15:
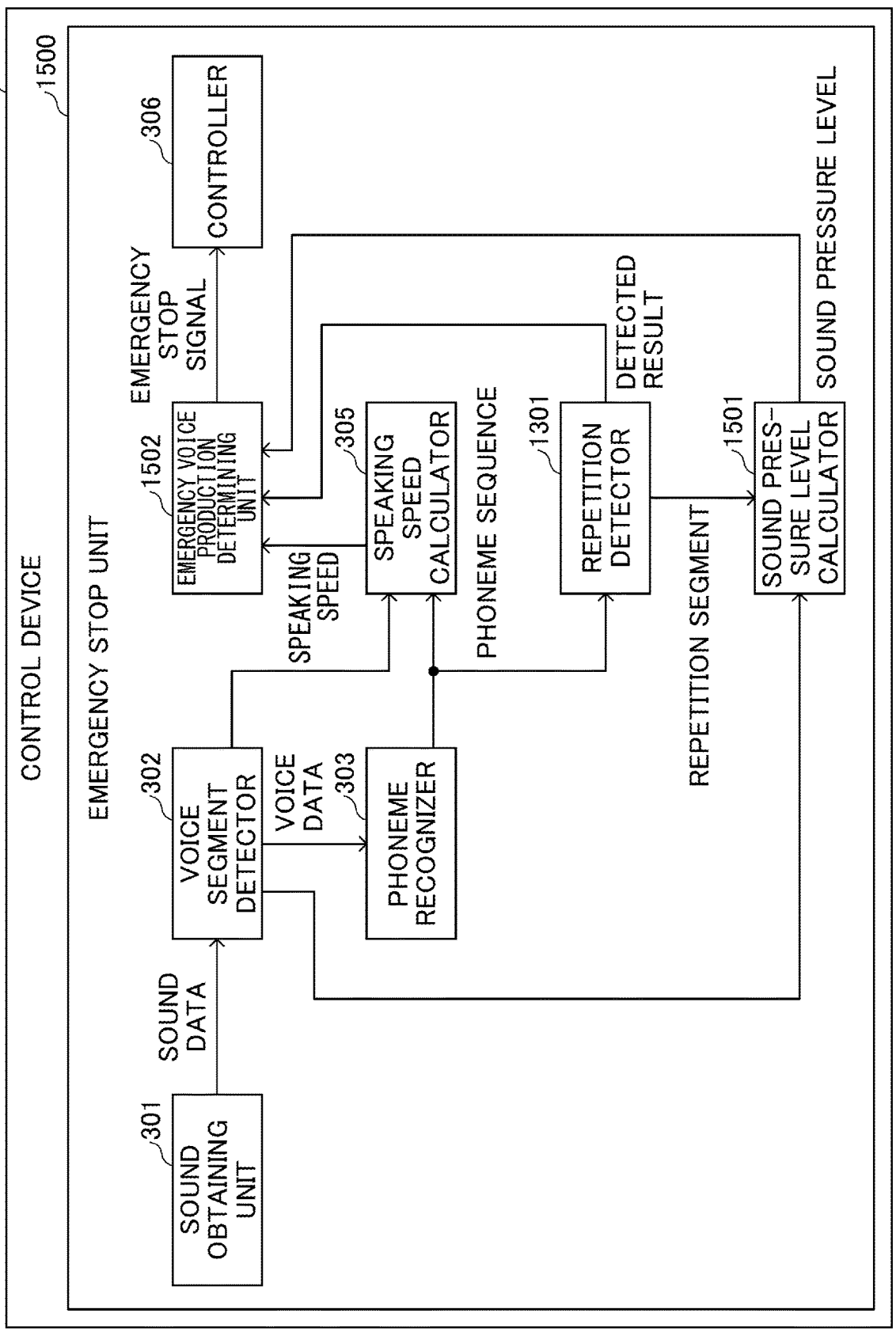
FIG. 15 is a seventh diagram illustrating an example of the functional configuration of the emergency stop unit of the control device.

First, a functional configuration of the emergency stop unit of the control device 100 according to the seventh embodiment will be described. FIG. 15 is a seventh diagram illustrating an example of the functional configuration of the emergency stop unit of the control device. The difference from the functional configuration illustrated in FIG. 13 is that, in an emergency stop unit 1500 of the control device 100 according to the seventh embodiment, a sound pressure level calculator 1501 substantially the same as the sound pressure level calculator described in the second embodiment is included, and an emergency voice production determining unit 1502 has a function different from the emergency voice production determining unit 1302.

The repetition detector 1301 detects voice segments (i.e., repetition segments) corresponding to respective repeating words, in addition to the detection of the repeating word and the output of the detected result, and outputs the detected voice segment to the sound pressure level calculator 1501. The sound pressure level calculator 1501 calculates the sound pressure levels of the voice segments (i.e., the repetition segments) corresponding to the respective repeating words. Additionally, the sound pressure level calculator 1501 outputs the calculated sound pressure level to the emergency voice production determining unit 1502.

The emergency voice production determining unit 1502 determines whether the following conditions are satisfied based on the speaking speed output by the speaking speed calculator 305, the detected result output by the repetition detector 1301, and the sound pressure level output by the sound pressure level calculator 1501.

The speaking speed is a predetermined speed threshold or greater.
The phoneme sequence contains repeating portions.
The sound pressure level increases (i.e., the sound pressure level in the repetition duration at the first time is less than the sound pressure level in the repetition duration at the second time that is after the first time).

If it is determined that all of the above conditions are satisfied, the emergency voice production determining unit 1502 outputs, to the controller 306, the emergency stop signal indicating that emergency voice production is detected. If it is determined that any one or more of the above-described conditions are not satisfied, the emergency voice production determining unit 1502 does not output the emergency stop signal to the controller 306.

As described, by using the condition that the sound pressure level increases in addition to the conditions that the speaking speed is the threshold value or greater and the phoneme sequence contains repeating portions, the emergency stop unit 1500 can determine with high accuracy whether a situation, in which an emergency stop is required, has occurred.

<Flow of the Emergency Stop Process>

Figure 16:
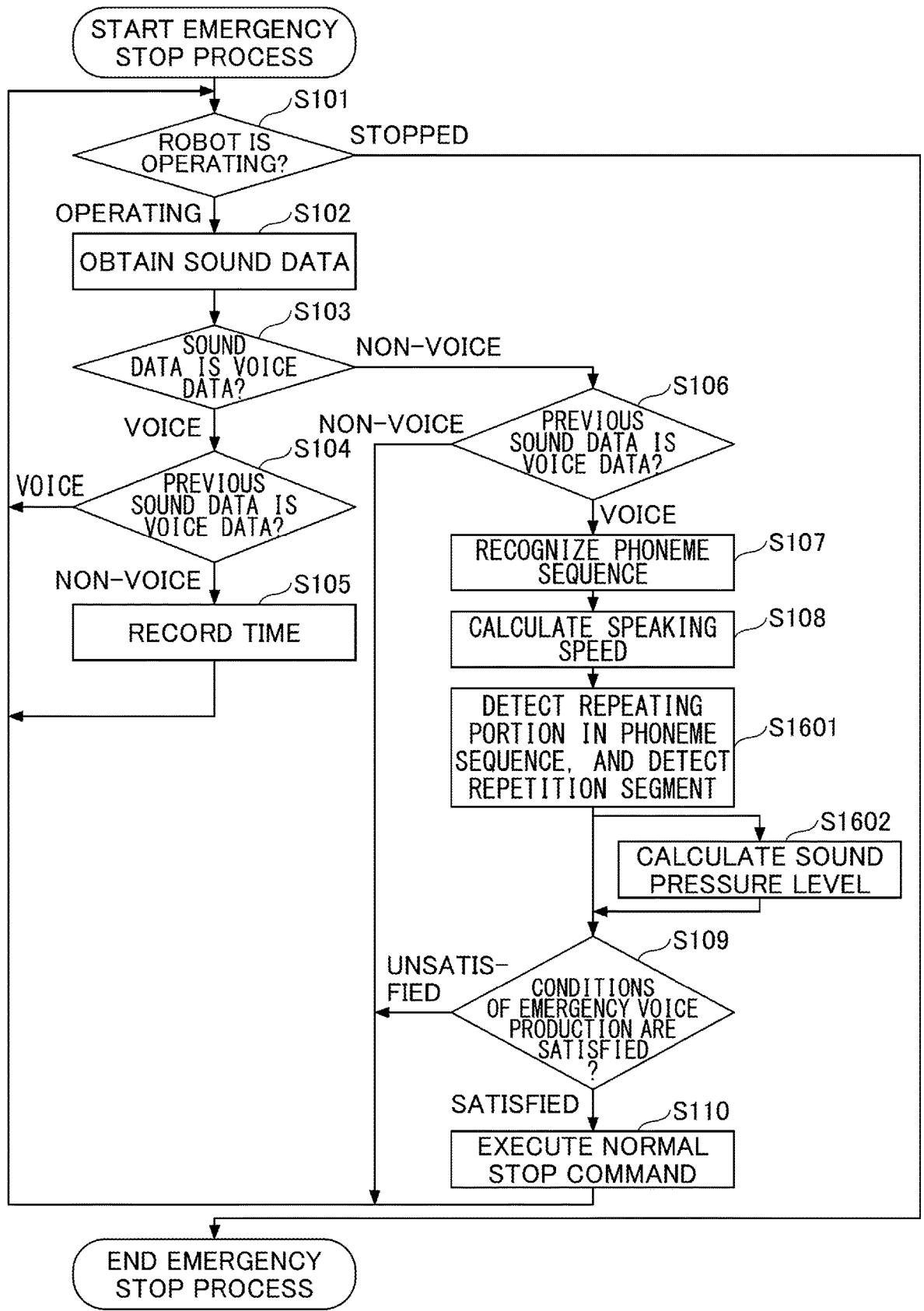
FIG. 16 is a seventh flowchart illustrating the flow of the emergency stop process performed by the emergency stop unit.

Next, a flow of the emergency stop process performed by the emergency stop unit 1500 will be described. FIG. 16 is a seventh flowchart illustrating the flow of the emergency stop process performed by the emergency stop. The differences from the flowchart illustrated in FIG. 6 are steps S1601 and S1602.

In step S1601, as in the sixth embodiment, the repetition detector 1301 detects repeating portions in the phoneme sequence recognized in step S107. In addition, the repetition detector 1301 detects the voice segments (i.e., the repetition segments) corresponding to respective repeating words.

In step S1602, the sound pressure level calculator 1501 calculates the sound pressure levels in the repetition segments detected in step S1601.

SUMMARY

As can be seen from the above description, in the seventh embodiment, there is focus on the fact that, when a situation, in which the operating robot is required to be stopped emergently, has occurred, the user repeatedly and quickly produces a short word, and the sound pressure level of the voice data corresponding to the short word gradually increases. The emergency stop unit of the control device according to the seventh embodiment determines that a situation, in which an emergency stop is required, has occurred if the following conditions are satisfied, and outputs an emergency stop signal.

The speaking speed is a predetermined speed threshold or greater.
The phoneme sequence corresponding to the user's voice contains repeating portions.
The sound pressure level in the repetition duration increases.

Consequently, according to the emergency stop unit of the control device according to the seventh embodiment, when a situation, in which the operating robot is required to be stopped emergently, has occurred, the robot can be emergently stopped appropriately based on the user's voice instruction. As a result, the robot can be operated as intended by the user.

In the present embodiment, the emergency voice production determining unit 1502 may detect the emergency voice production by using the length of the voice segment output by the voice segment detector 302, in addition to the speaking speed output by the speaking speed calculator 305, the detected result output by the repetition detector 1301, and the sound pressure level of the repetition duration output by the sound pressure level calculator 1501. In this case, if it is determined that all of the following conditions are met, the emergency voice production determining unit 1502 outputs, to the controller 306, the emergency stop signal indicating that emergency voice production is detected.

The speaking speed is a predetermined speed threshold or greater.
The length of the voice segment is a predetermined length threshold or less.
The phoneme sequence contains repeating portions.
The sound pressure level increases.

Other Embodiments

In the embodiments described above, the speaking speed is calculated by calculating the number of phonemes per unit time. However, the method of calculating the speaking speed is not limited to this. For example, the speaking speed may be calculated by using a unit smaller than a phoneme. Alternatively, the speaking speed may be calculated by using a unit greater than a phoneme (e.g., a mora, a syllable, or a word).

In the second to fifth embodiments described above, a case, in which any one of the conditions newly indicated in the above-described second to fifth embodiments is added to the conditions indicated in the first embodiment, has been described. However, multiple conditions of the conditions newly indicated in the second to fifth embodiments may be combined with the conditions indicated in the first embodiment.

Alternatively, a part of the conditions newly indicated in the second to seventh embodiments may be combined with a part of the conditions indicated in the first embodiment. For example, it may be determined that a situation, in which an emergency stop is required, has occurred and the emergency stop signal may be output if the following conditions are satisfied.

The length of the voice segment is a predetermined length threshold or less.
The sound pressure level is a predetermined pressure threshold or greater.

Alternatively, it may be determined that a situation, in which an emergency stop is required, has occurred and the emergency stop signal may be output if the following conditions are satisfied.

The length of the voice segment is a predetermined length threshold or less.
The phoneme sequence contains (or does not contain) a predetermined phoneme sequence.

Alternatively, it may be determined that a situation, in which an emergency stop is required, has occurred and the emergency stop signal may be output if the following conditions are satisfied.

The length of the voice segment is a predetermined length threshold or less.
The phoneme sequence contains repeating portions.

Alternatively, it may be determined that a situation, in which an emergency stop is required, has occurred and the emergency stop signal may be output if the following conditions are satisfied.

The length of the voice segment is a predetermined length threshold or less.
The phoneme sequence contains repeating portions.
The sound pressure level increases.

In the embodiments described above, the controller 306 is described as controlling the movable part 40. However, the controller 306 may be configured to control an element other than the movable part 40. For example, if the robot 10 includes an audio output unit, the audio output unit may be controlled to operate based on the emergency stop command (i.e., the audio output unit may be controlled such that the audio output unit is stopped and a speaker is turned off). Alternatively, if the robot 10 includes a display, the display may be controlled to operate based on the emergency stop command (i.e., the display may be controlled such that displaying is stopped and a screen is turned off). Such a control is effective in a case where the robot 10 performs an inappropriate audio output or an inappropriate display output.

In the embodiments described above, the function of the emergency stop unit is described as being achieved by the processor 201 executing the emergency stop program. However, the function of the emergency stop unit may be achieved by analog circuitry, digital circuitry, or circuitry including analog-digital mixed circuitry. A control circuit may also be provided to achieve the function of the emergency stop unit. Each circuit may be implemented by an application specific integrated circuit (ASIC), a field programmable gate array (FPGA), or the like.

Further, in the embodiments described above, in order to execute the emergency stop program, the emergency stop program may be stored in a storage medium such as a flexible disk or a CD-ROM, and may be read and executed by a computer. The storage medium is not limited to a removable one such as a magnetic disk or an optical disk, but may be a fixed storage medium such as a hard disk device or a memory. Additionally, the processing of software may be implemented in a circuit such as an FPGA and may be executed by hardware. Job execution may be performed using an accelerator such as a graphics processing unit (GPU).

Here, the present invention is not limited to the above-described configurations, such as the configurations described in the above-described embodiments, and the combinations with other elements. In these respects, modifications can be made without departing from the scope of the subject matter of the present invention, and the configuration can be appropriately determined in accordance with the application form.

What is claimed is:

1. A control device, comprising:
    at least one memory that stores sound data collected by a sound collecting device; and
    at least one processor configured to:
        detect a voice segment from the sound data, the sound data being detected while a controlled object operates, wherein the motion of the controlled object is controlled by the control device;
        calculate a speaking speed based on a portion of the sound data in the voice segment;
        calculate a length of the voice segment; and
        stop the controlled object based on following conditions:
            the calculated speaking speed is a predetermined speed threshold or greater; and
            the calculated length of the voice segment is a predetermined length threshold or less,
    wherein the at least one processor is configured to stop the controlled object by at least one of i) controlling at least a power supply for an element related to an operation of the controlled object to stop at least the power supply or ii) controlling a brake or a lock that is provided to the controlled object to stop the operation of the controlled object.

2. The control device as claimed in claim 1, wherein the at least one processor is configured to stop the controlled object based on following conditions:
    the speaking speed is the predetermined speed threshold or greater;
    the length of the voice segment is the predetermined length threshold or less; and
    a sound pressure level of the portion of the sound data in the voice segment is a predetermined pressure threshold or greater.

3. The control device as claimed in claim 2, wherein the sound pressure level of the portion of the sound data in the voice segment is a value based on a difference from a sound pressure level of sound data in a non-voice segment that is not the voice segment.

4. The control device as claimed in claim 1, wherein the at least one processor is configured to stop the controlled object based on following conditions:
    the speaking speed is the predetermined speed threshold or greater;
    the length of the voice segment is the predetermined length threshold or less; and
    a phoneme sequence contains a predetermined phoneme sequence, the phoneme sequence being recognized based on the portion of the sound data in the voice segment.

5. The control device as claimed in claim 1, wherein the at least one processor is configured to stop the controlled object based on following conditions:
    the speaking speed is the predetermined speed threshold or greater;
    the length of the voice segment is the predetermined length threshold or less; and
    a phoneme sequence does not contain a predetermined phoneme sequence, the phoneme sequence being recognized based on the portion of the sound data in the voice segment.

6. The control device as claimed in claim 1, wherein the at least one processor is configured to:
    detect a face area from image data and recognize a face direction based on the detected face area, the image data being captured during the voice segment, and
    stop the controlled object based on following conditions:
        the speaking speed is the predetermined speed threshold or greater;
        the length of the voice segment is the predetermined length threshold or less; and
        the face direction is directed in a predetermined direction.

7. The control device as claimed in claim 6, wherein the at least one processor detects the face area that is positioned in an incoming direction of a sound in the voice segment, in the image data captured during the voice segment.

8. A system comprising:
    the control device as claimed in claim 1; and
    the controlled object, the operation of the controlled object being controlled by the control device.

9. A control device, comprising:
    at least one memory that stores sound data collected by a sound collecting device; and
    at least one processor configured to:
        detect a voice segment from the sound data that is detected while a controlled object operates, wherein the motion of the controlled object is controlled by the control device;
        calculate a length of the voice segment;
        calculate a sound pressure level of a portion of the sound data in the voice segment; and
        stop the controlled object based on following conditions:
            the calculated length of the voice segment is a predetermined length threshold or less; and
            the calculated sound pressure level of the portion of the sound data in the voice segment is a predetermined pressure threshold or greater,
    wherein the at least one processor is configured to stop the controlled object by at least one of i) controlling at least a power supply for an element related to an operation of the controlled object to stop at least the power supply or ii) controlling a brake or a lock that is provided to the controlled object to stop the operation of the controlled object.

10. The control device as claimed in claim 9, wherein the sound pressure level of the portion of the sound data in the voice segment is a value based on a difference from a sound pressure level of sound data in a non-voice segment that is not the voice segment.

11. A system comprising:
    the control device as claimed in claim 9; and
    the controlled object, the operation of the controlled object being controlled by the control device.

12. A control device, comprising:
at least one memory that stores sound data collected by a sound collecting device; and
at least one processor configured to:
detect a voice segment from the sound data that is detected while a controlled object operates, wherein the motion of the controlled object is controlled by the control device;
calculate a length of the voice segment;
detect a phoneme sequence based on a portion of the sound data in the voice segment sound; and
stop the controlled object based on following conditions:
the calculated length of the voice segment is a predetermined length threshold or less; and
the detected phoneme sequence contains a predetermined phoneme sequence,
wherein the at least one processor is configured to stop the controlled object by at least one of i) controlling at least a power supply for an element related to an operation of the controlled object to stop at least the power supply or ii) controlling a brake or a lock that is provided to the controlled object to stop the operation of the controlled object.

13. A system comprising:
the control device as claimed in claim 12; and
the controlled object, the operation of the controlled object being controlled by the control device.

14. A control device, comprising:
at least one memory that stores sound data collected by a sound collecting device; and
at least one processor configured to:
detect a voice segment from the sound data that is detected while a controlled object operates, wherein the motion of the controlled object is controlled by the control device;
calculate a length of the voice segment;
detect a phoneme sequence based on a portion of the sound data in the voice segment sound; and
stop the controlled object based on following conditions:
the calculated length of the voice segment is a predetermined length threshold or less; and
the detected phoneme sequence does not contain a predetermined phoneme sequence,
wherein the at least one processor is configured to stop the controlled object by at least one of i) controlling at least a power supply for an element related to an operation of the controlled object to stop at least the power supply or ii) controlling a brake or a lock that is provided to the controlled object to stop the operation of the controlled object.

15. A control device, comprising:
at least one memory that stores sound data collected by a sound collecting device; and
at least one processor configured to:
detect a voice segment from the sound data that is detected while a controlled object operates, wherein the motion of the controlled object is controlled by the control device;
calculate a speaking speed based the sound data in the voice segment;
detect a phoneme sequence in the voice segment sound; and
stop the controlled object based on following conditions:
the calculated speaking speed is a predetermined speed threshold or greater; and
the detected phoneme sequence in the voice segment contains a repeating portion,
wherein the at least one processor is configured to stop the controlled object by at least one of i) controlling at least a power supply for an element related to an operation of the controlled object to stop at least the power supply or ii) controlling a brake or a lock that is provided to the controlled object to stop the operation of the controlled object.

16. The control device as claimed in claim 15, wherein the at least one processor is configured to stop the controlled object in a case where a sound pressure level of the sound data of a first repeating portion included in the phoneme sequence at a first time is less than a sound pressure level of the sound data of a second repeating portion included in the phoneme sequence at a second time, the second time being after the first time, said first repeating portion being repeated words that are the same as words repeated as the second repeating portion.

17. A control method, comprising:
detecting, by at least one processor, a voice segment from sound data that is detected while a controlled object operates;
calculate, by the at least one processor, a speaking speed based on the sound data in the voice segment;
calculate, by the at least one processor, a length of the voice segment; and
stopping, by the at least one processor, the controlled object based on following conditions:
the calculated speaking speed is a predetermined speed threshold or greater; and
the calculated length of the voice segment is a predetermined length threshold or less,
wherein the at least one processor is configured to stop the controlled object by at least one of i) controlling at least a power supply for an element related to an operation of the controlled object to stop at least the power supply or ii) controlling a brake or a lock that is provided to the controlled object to stop the operation of the controlled object.

18. A control method, comprising:
detecting, by at least one processor, a voice segment from sound data that is detected while a controlled object operates;
calculating, by the at least one processor, a length of the voice segment;
calculating, by the at least one processor, a sound pressure level of a portion of the sound data in the voice segment; and
stopping, by the at least one processor, the controlled object based on following conditions:
the calculated length of the voice segment is a predetermined length threshold or less; and
the calculated sound pressure level of the portion of the sound data in the voice segment is a predetermined pressure threshold or greater,
wherein the at least one processor is configured to stop the controlled object by at least one of i) controlling at least a power supply for an element related to an operation of the controlled object to stop at least the power supply or ii) controlling a brake or a lock that is provided to the controlled object to stop the operation of the controlled object.

* * * * *